(12) United States Patent
Zhang et al.

(10) Patent No.: US 9,625,931 B2
(45) Date of Patent: Apr. 18, 2017

(54) BYPASS TYPE 220V GRID VOLTAGE SAG PREVENTION DEVICE AND CONTROL METHOD THEREFOR

(71) Applicant: Northeastern University, Shenyang (CN)

(72) Inventors: HuaGuang Zhang, Shenyang (CN); DongSheng Yang, Shenyang (CN); ZhiLiang Wang, Shenyang (CN); Jian Feng, Shenyang (CN); XuanZhe Peng, Shenyang (CN); YanHong Luo, Shenyang (CN); Nan Wang, Shenyang (CN); GuoTao Hui, Shenyang (CN); Xue Liang, Shenyang (CN); Jun Yang, Shenyang (CN)

(73) Assignee: Northeastern University, Shenyang, Liaoning Province (CN)

( * ) Notice: Subject to any disclaimer, the term of this patent is extended or adjusted under 35 U.S.C. 154(b) by 457 days.

(21) Appl. No.: 14/278,524

(22) Filed: May 15, 2014

(65) Prior Publication Data

US 2015/0188361 A1 Jul. 2, 2015

(30) Foreign Application Priority Data

Dec. 31, 2013 (CN) .......................... 2013 1 0750554

(51) Int. Cl.
*H02J 9/06* (2006.01)
*G05F 1/67* (2006.01)

(52) U.S. Cl.
CPC ................ *G05F 1/67* (2013.01); *H02J 9/061* (2013.01); *H02J 9/062* (2013.01); *Y10T 307/625* (2015.04)

(58) Field of Classification Search
CPC ....... Y10T 307/625; H02J 9/061; H02J 9/062; H02J 9/06
See application file for complete search history.

(56) References Cited

U.S. PATENT DOCUMENTS

| | | | | |
|---|---|---|---|---|
| 6,175,311 | B1 * | 1/2001 | Li | H02J 9/062 |
| | | | | 307/64 |
| 9,450,453 | B2 * | 9/2016 | Yeh | H02J 7/022 |
| 2008/0164763 | A1 * | 7/2008 | Mount | H02J 9/062 |
| | | | | 307/66 |

(Continued)

*Primary Examiner* — Ryan Johnson
(74) *Attorney, Agent, or Firm* — Muncy, Geissler, Olds & Lowe, P.C.

(57) ABSTRACT

Provided are a bypass type 220V grid voltage sag prevention device and a control method therefor. The bypass type 220V grid voltage sag prevention device comprises an AC-to-DC energy storage unit, a Single Chip Microcomputer (SCM) control and display unit, and an inverter output unit. The AC-to-DC energy storage unit comprises a rectifier circuit, an energy storage control circuit and a quick tank circuit; the SCM control and display unit comprises an SCM, a DC step-down module circuit and an energy storage voltage detecting circuit; and the inverter output unit comprises a high-frequency PWM generating circuit, a high-frequency transformer output circuit, a transformer output full-bridge rectifier circuit, a PWM generating circuit, a PWM driving and full-bridge inverter circuit, a 220V grid zero-cross point detecting circuit, a 220V grid voltage detecting circuit, a 220V grid and inversion AC converting circuit, and a signal interface circuit.

3 Claims, 24 Drawing Sheets

(56) References Cited

U.S. PATENT DOCUMENTS

2009/0091189 A1\* 4/2009 Soeda .................. H02J 1/00
 307/66
2014/0209415 A1\* 7/2014 Hall .................. B66B 5/027
 187/290

\* cited by examiner

BYPASS TYPE 220V GRID VOLTAGE SAG PREVENTION DEVICE AND CONTROL METHOD THEREFOR

CROSS-REFERENCE TO RELATED APPLICATION

This application claims the priority of Chinese patent application No. 201310750554.9, filed on Dec. 31, 2013, which is incorporated herewith by reference.

BACKGROUND OF THE INVENTION

1. Field of the Invention

The present invention relates to the field of automatic control on electrical power system, in particular to a bypass type 220V grid voltage sag prevention device and a control method therefor.

2. the Prior Arts

During the normal electrical power supply of a grid, the start-up of reclosers and high-capacity equipment due to short circuit or thunder and lightning weather can cause short-time instability to the voltage of the grid, called "voltage sag". When system voltage fails to meet the requirement of self perpetuate, an AC contactor controlling a low-voltage electric motor will be released abnormally, thus causing direct damage to continuous production and even threatening personnel safety.

There are several solutions to the release problem of AC contactor caused by voltage sag, including: (1) improve the performance of the contactor; (2) add a control device to the contactor; (3) restart after release. However, these solutions all have shortages. Firstly, the first two improvement solutions will increase the cost of buying components; secondly, there are very few manufacturers having higher production performance or contactors with control devices, thus the selecting range is narrow; thirdly, the control method for restarting after release has impact and will bring damage to the operation of the equipment.

SUMMARY OF THE INVENTION

In consideration of the shortage of the prior art, the present invention provides a bypass type 220V grid voltage sag prevention device and a control method therefor.

The present invention relates to a bypass type 220V grid voltage sag prevention device, comprising: an AC-to-DC energy storage unit, a Single Chip Microcomputer (SCM) control and display unit, and an inverter output unit.

The AC-to-DC energy storage unit comprises a rectifier circuit, an energy storage control circuit and a quick tank circuit. The input end of the rectifier circuit is connected with a 220V grid, the output end of the rectifier circuit is connected with the input end of the energy storage control circuit, and the output end of the energy storage control circuit is connected with the input end of the quick tank circuit.

The SCM control and display unit comprises an SCM, a DC step-down module circuit and an energy storage voltage detecting circuit. The input end of the energy storage voltage detecting circuit is connected with one output end of the quick tank circuit, the output end of the energy storage voltage detecting circuit is connected with the signal input end of the SCM, the input end of the DC step-down module circuit is connected with one output end of the rectifier circuit, the control output end of the SCM is connected with the input end of the energy storage control circuit, and the power supply port of the SCM is connected with the output end of the DC step-down module circuit.

The inverter output unit comprises a high-frequency PWM generating circuit, a high-frequency transformer output circuit, a transformer output full-bridge rectifier circuit, a PWM generating circuit, a PWM driving and full-bridge inverter circuit, a 220V grid zero-cross point detecting circuit, a 220V grid voltage detecting circuit, a 220V grid and inversion AC converting circuit, and a signal interface circuit.

The input end of the high-frequency PWM generating circuit is connected with the output end of the quick tank circuit, one output end of the high-frequency PWM generating circuit is connected with the input end of the DC step-down module circuit, the other output end of the high-frequency PWM generating circuit is connected with one input end of the high-frequency transformer output circuit, the other input end of the high-frequency transformer output circuit is connected with the output end of the quick tank circuit, the output end of the high-frequency transformer output circuit is connected with the input end of the transformer output full-bridge rectifier circuit, the output end of the transformer output full-bridge rectifier circuit is connected with one input end of the PWM driving and full-bridge inverter circuit, the output end of the PWM driving and full-bridge inverter circuit is connected with one input end of the 220V grid and inversion AC converting circuit, the other two input ends of the PWM driving and full-bridge inverter circuit are respectively connected with the output end of the PWM generating circuit and the enable port of the SCM, the input end of the PWM generating circuit is connected with the signal output port of the SCM, the other two input ends of the 220V grid and inversion AC converting circuit are respectively connected with the signal output end of the SCM and the 220V grid, the output end of the 220V grid and inversion AC converting circuit is connected with a load, the input end of the 220V grid zero-cross point detecting circuit and the input end of the 220V grid voltage detecting circuit are respectively connected with the 220V grid, and the output end of the 220V grid zero-cross point detecting circuit and the output end of the 220V grid voltage detecting circuit are respectively connected with different signal input ends of the SCM.

The SCM control and display unit further comprises an operating condition indicating circuit, a key circuit and an LED display circuit. The output end of the operating condition indicating circuit, the output end of the functional key circuit and the input end of the LED display circuit are respectively connected with different IO ports of the SCM.

The control method for the bypass type 220V grid voltage sag prevention device comprises the following steps:

Step 1: Voltage sag response speed and frequency detecting time are set up by the SCM, and voltage signals of the 220V grid are rectified by the rectifier circuit and then sent to a DC step-down module to supply power to the SCM, the energy storage voltage detecting circuit, an optocoupler isolating circuit and the signal interface circuit.

Step 2: After rectified by the rectifier circuit, the voltage signals of the 220V grid enter the energy storage control circuit, and the energy storage control circuit is controlled by the charging control signals of the SCM to control the quick tank circuit to be quickly charged.

Step 3: The energy storage voltage detecting circuit monitors the voltage of the tank circuit in real time; when the voltage of the tank circuit reaches the set value, the SCM stops outputting charging control signals, and the quick tank circuit stops being charged.

Step 4: The quick tank circuit respectively outputs voltage to the high-frequency PWM generating circuit and the high-frequency transformer output circuit.

Step 5: The high-frequency PWM generating circuit generates high-frequency PWM signals of 40 KHz to 50 KHz to act on the high-frequency transformer output circuit.

Step 6: AC signals output by the high-frequency transformer output circuit enter the PWM driving and full-bridge inverter circuit through the transformer output full-bridge rectifier circuit.

Step 7: The SCM activates the PWM generating circuit and the PWM driving and full-bridge inverter circuit.

Step 8: The PWM generating circuit generates PWM signals and inputs the PWM signals to the PWM phase detecting port of the SCM to calculate the phase of the inverter output voltage, meanwhile, the phase of the AC 220V grid is detected by the 220V grid zero-cross point detecting circuit. When the phase of the inverter output voltage is different from that of the AC 220V grid, the SCM outputs synchronization signals to act on the PWM generating circuit in order to adjust the phase of the inverter output voltage and make the two phases consistent; the PWM driving and full-bridge inverter circuit is controlled by the PWM generating circuit to output an alternate current having the same phase as the 220V grid to the 220V grid and inversion AC converting circuit.

Step 9: The voltage of the AC 220V grid is acquired by the 220V grid voltage detecting circuit in real time. When the acquired voltage of the AC 220V grid is within 0.3 to 0.8 times of the standard sinusoidal voltage of the AC 220V grid, the grid is in voltage sag state, do Step 10; otherwise, supply power to the load by the 220V grid.

Step 10: The SCM outputs 220V grid and inversion AC converting signals at the set voltage sag response speed, the 220V grid and inversion AC converting circuit completes fast switch over, and the alternate current generated by the PWM driving and full-bridge inverter circuit is supplied to the load; return to Step 8.

Step 11: When power is supplied to the load by the 220V grid, the zero-cross points of the AC 220V grid are detected by the 220V grid zero-cross point detecting circuit according to the set frequency detecting time, then the frequency of the AC 220V grid is calculated, and the standard sinusoidal voltage of the AC 220V grid is recalculated according to this frequency; return to Step 8.

The present invention has the following advantages:

(1) The present invention adopts an inverter bypass operating mode, which does not change the structure of the contactor, does not influence the normal operation of the contactor and does not have impact problems, but has generality for contactors produced by all companies, reduces the cost and increases the system reliability.

(2) Inversion PWM signals are generated by a PWM module dedicated chip which is synchronously controlled by the SCM, therefore, the complexity of system control program is reduced.

(3) The device is in hot standby state all the time, therefore, it is ensured that the inverter can be switched over within 20 ms to supply power to the AC contactor.

(4) The control algorithm is sampling and look-up table, which can judge whether the grid has a voltage sag or not quickly and accurately, and a sine table can be automatically refreshed at set intervals, which has strong adaptability to the waveform changes of the grid.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 19:
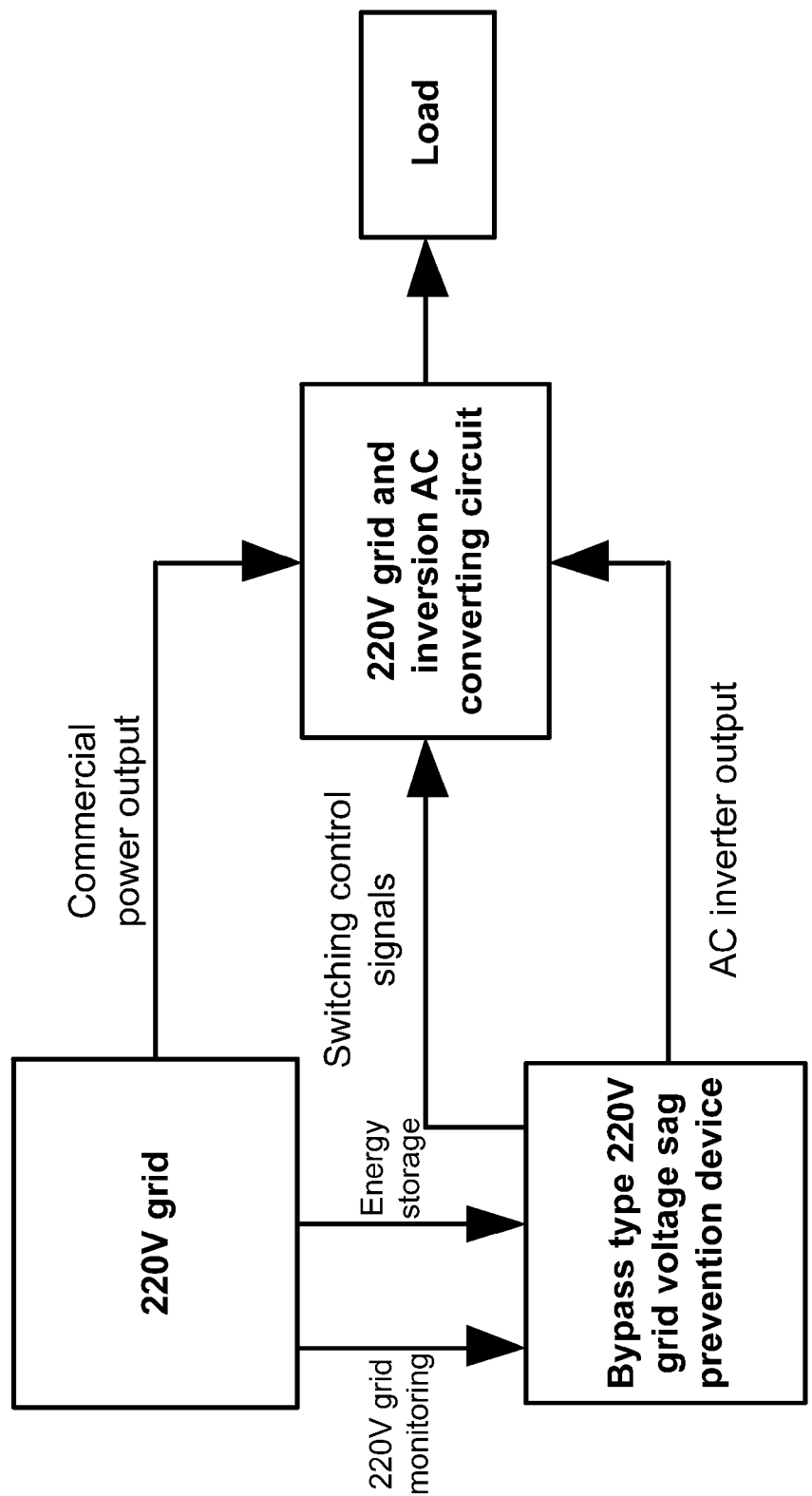
FIG. 19 is the schematic diagram of the operating principle of the bypass type grid voltage sag prevention device in the embodiment of the present invention.

The present invention is further described by figures and the embodiment as follows:

As shown in FIG. 19, in the embodiment, the load is supplied by the 220V grid when the 220V grid is in normal condition, meanwhile, the bypass type grid voltage sag prevention device conducts energy storage and monitors the 220V grid to ensure that the AC inverter output and the 220V grid are synchronous; when a voltage sag of the grid is detected by the bypass type grid voltage sag prevention device, the prevention device will output switching control signals to activate the 220V grid and inversion AC converting circuit, and the load is changed to be supplied by the AC inverter output.

Figure 1A:
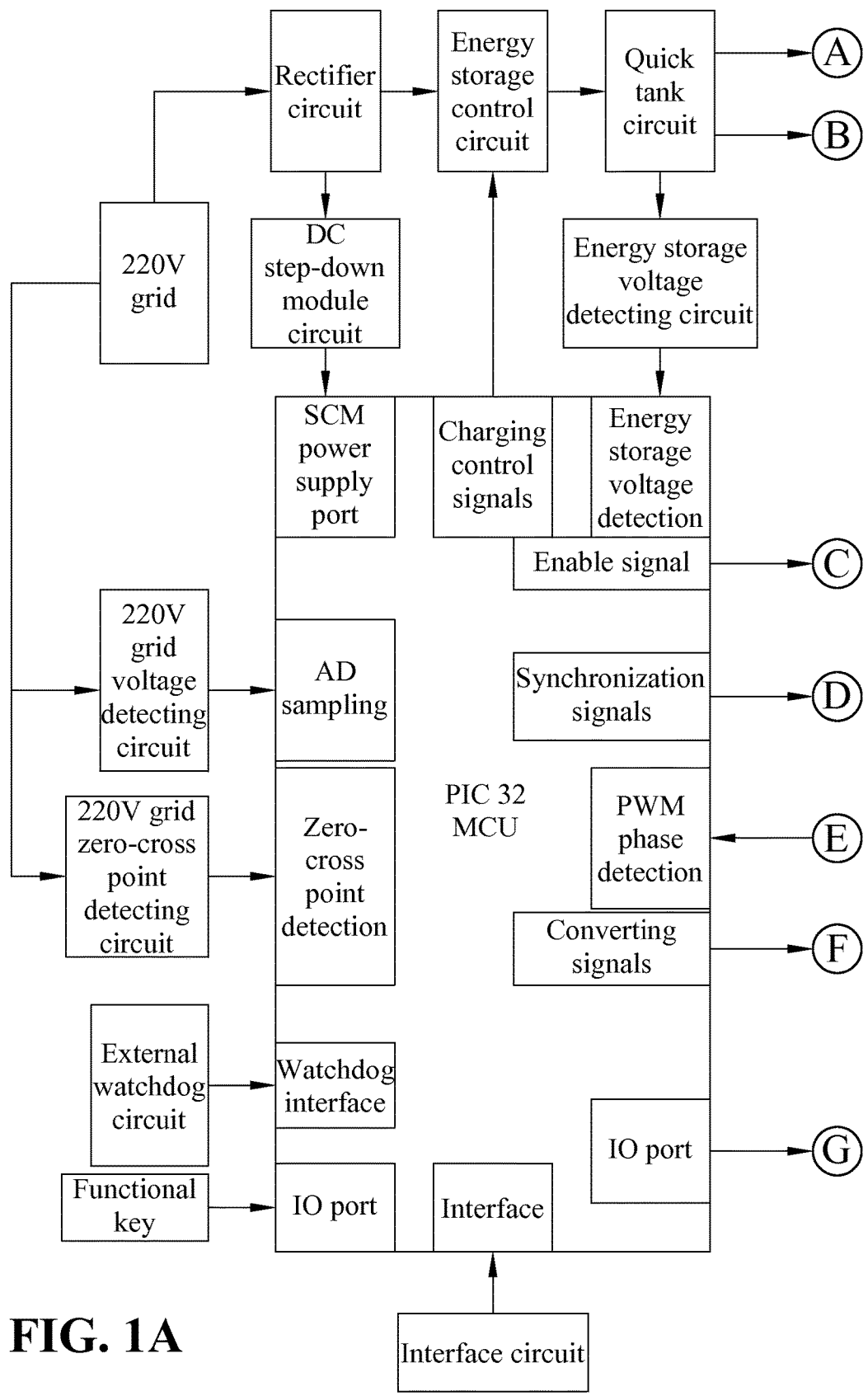
FIGS. 1A and 1B are the structural block diagram of the bypass type 220V grid voltage sag prevention device in the embodiment of the present invention.
Figure 1B:
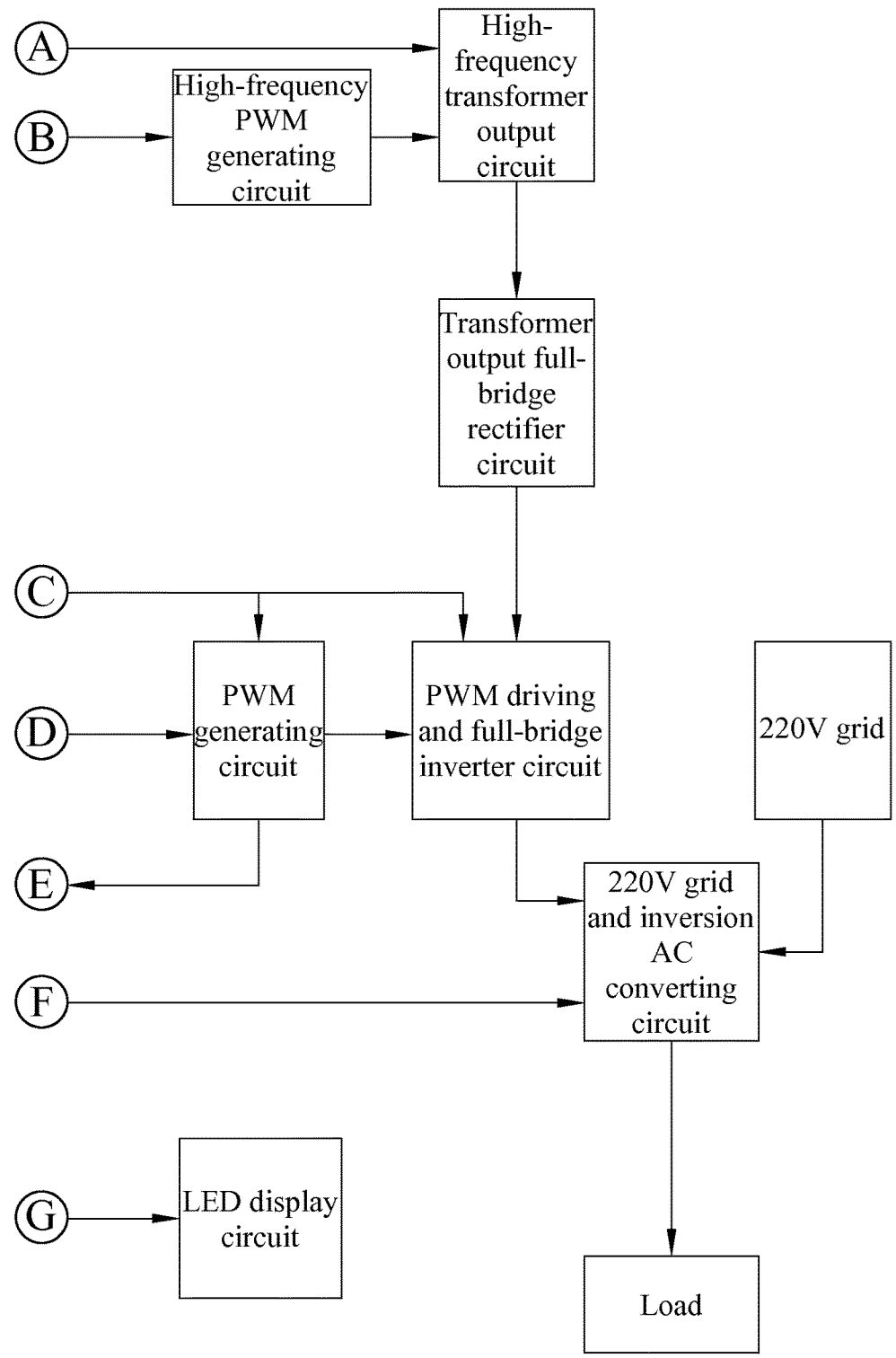

As shown in FIGS. 1A and 1B, the bypass type 220V grid voltage sag prevention device comprises the AC-to-DC energy storage unit, the SCM control and display unit, and the inverter output unit. The AC-to-DC energy storage unit comprises the rectifier circuit, the energy storage control circuit and the quick tank circuit. The input end of the rectifier circuit is connected with a 220V grid, the output end of the rectifier circuit is connected with the input end of the energy storage control circuit, and the output end of the energy storage control circuit is connected with the input end of the quick tank circuit.

Figure 2:
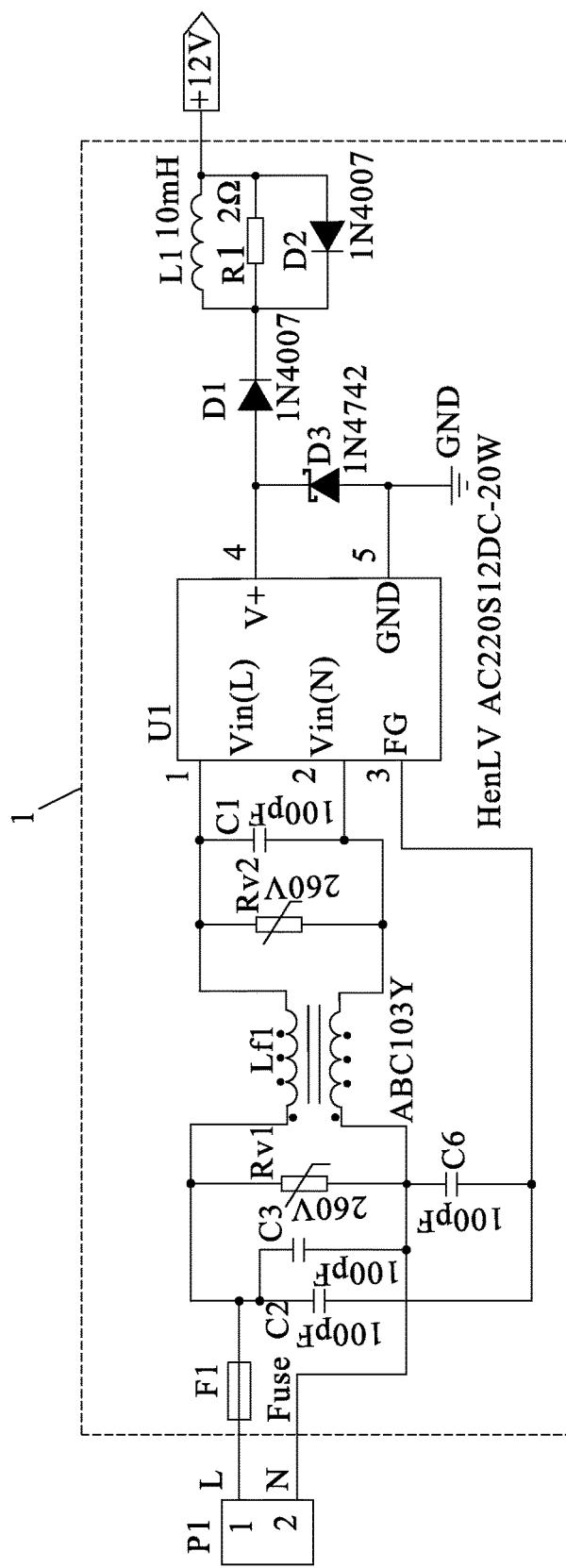
FIG. 2 is the diagram of the rectifier circuit in the embodiment of the present invention.

The rectifier circuit is shown in FIG. 2. Pin 1 of a connector P1 used for connecting the rectifier circuit 1 to the 220V grid is connected with pin 1 of a rectifier module U1 through a fuse F1 and one side of a common mode inductor Lf1; the rectifier module U1 is a HenLV AC220S12DC-20W rectifier module with the characteristics of large operating voltage range, high power and stable DC voltage output, and rectifies the voltage from 220V into +12V. Pin 2 of the connector P1 is connected with pin 2 of the rectifier module U1 through the other side of Lf1, and pin 3 of the rectifier module U1 is connected in series with C2 on the output end of the fuse. A filter capacitor C2, a filter capacitor C3 and a voltage dependent resistor Rv1 are connected in parallel with the circuit connecting with pins 1 and 2 of the connector P1; a filter capacitor C1 and a voltage dependent resistor Rv2 are connected in parallel with the circuit connecting with pins 1 and 2 of the rectifier module U1. Pin 4 of the rectifier module U1 is connected with the cathodes of a inductor L1, a resistor R1 and a diode D2 through a diode D1 of 1N4007 type, and the reverse blocking function of D1 is used to prevent external electric current from returning to pin 4 and damaging U1. Pin 5 of the rectifier module U1 is directly grounded, and the forward end of D2 outputs +12V voltage signals. A diode D3 is in connected between pins 4 and 5 of the rectifier module U1 reversely; the diode D3 is a 1N4742 type Zener diode with a rated voltage of +12V and has the function of outputting a voltage stably. Pins 4 and 5 of U1 output a stable +12V DC voltage stably, and this voltage is input to the energy storage control circuit after being filtered and protected by the inductors, resistors and diodes.

Figure 3:
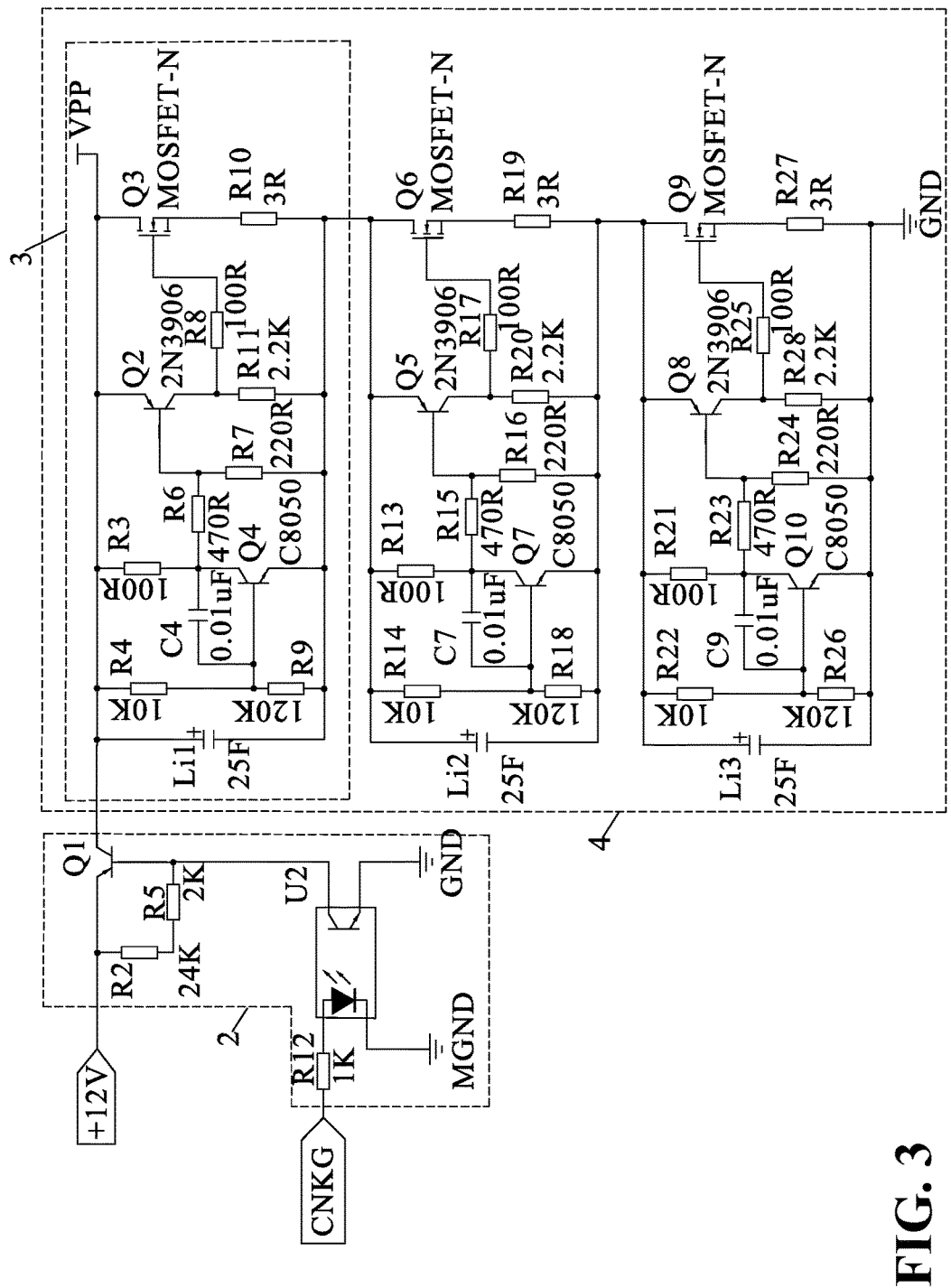
FIG. 3 is the diagram of the energy storage control circuit and quick tank circuit in the embodiment of the present invention.

The energy storage control circuit 2 and the quick tank circuit 4 are shown in FIG. 3. The specific principle of the energy storage control circuit 2 is as follows: the +12V voltage output by the rectifier circuit is connected with the emitting electrode of a triode Q1, the collecting electrode of the triode Q1 is connected with VPP, the voltage signals output by the collecting electrode of Q1 are VPP, the base electrode of the triode Q1 is connected with pin 4 of an optocoupler U2, and the charging control signals CNKG output by the SCM is input to the bas electrode of Q1 through the optocoupler U2 to control the on/off of Q1. Pin 1 of the optocoupler U2 is connected with the output pin of the SCM through a resistor R12. Pins 2 and 3 of the optocoupler U2 are respectively connected with MGND and GND. The quick tank circuit 4 comprises three quick tank circuit minimum modules 3 which are connected in series and have the same principle. The specific principle of the quick tank circuit minimum modules 3 is as follows: the anode of a lithium battery is connected to the cathode of the lithium battery through resistors R4 and R9, the common end of resistors R4 and R9 is connected with the base electrode of a triode Q4, the collecting electrode of the triode Q4 is connected with VPP through a resistor R3, and the emitting electrode of the triode Q4 is connected with the cathode of the lithium battery. The base electrode of a triode Q2 is connected with the collecting electrode of the triode Q4 through a resistor R6, the emitting electrode of the triode Q2 is connected with VPP, and the collecting electrode of the triode Q2 is connected with the cathode of the lithium battery through a resistor R11. The collecting electrode of the triode Q2 is connected with the gate electrode of an n-channel MOS transistor Q3 through R8, the drain electrode of Q3 is connected with VPP, and the source electrode of Q3 is connected with the cathode of the lithium battery through a resistor R10. In the quick tank circuit, multiple quick tank circuit minimum modules with the same structure are connected in series. In the embodiment, there are three quick tank circuit minimum modules connected in series, and the end of the last module is connected with GND. When Q1 is switched on, charging of lithium batteries Li1, Li2 and Li3 start. At first, the lithium batteries are charged by a series loop formed by Li1, Li2 and Li3; when Li1 is charged to a certain capacity, the voltage of R9 acts on the base electrode of Q4 under the action of voltage division of the resistor to switch on Q4; the switch-on of Q4 makes the voltage of a resistor R7 close to zero, Q2 is switched on at this moment, and the voltage of R11 acts on the gate electrode of Q3 to switch on Q3. After that, Li2 has two charging loops, i.e. the series loop formed by Li1, Li2 and Li3 and the series loop formed by Q3, R10, Li2 and Li3. Li2 is quickly charged under the action of the two loops. In the loop formed by Q3, R10, Li2 and Li3, the resistor R10 has the function of controlling the charging current of Li2 at the switch-on moment of Q3, which can improve the working efficiency and lifetime of the lithium battery. The charging process of the lithium batteries Li2 and Li3 are the same as that of Li1.

The SCM control and display unit comprises the SCM PIC32MX250F128D-I/PT, the DC step-down module circuit and the energy storage voltage detecting circuit. The input end of the energy storage voltage detecting circuit is connected with one output end of the quick tank circuit, the output end of the energy storage voltage detecting circuit is connected with the signal input end of the SCM, the input end of the DC step-down module circuit is connected with the other output end of the quick tank circuit, the control output end of the SCM is connected with the input end of the energy storage control circuit, and the power supply port of the SCM is connected with the output end of the DC step-down module circuit.

Figure 4:
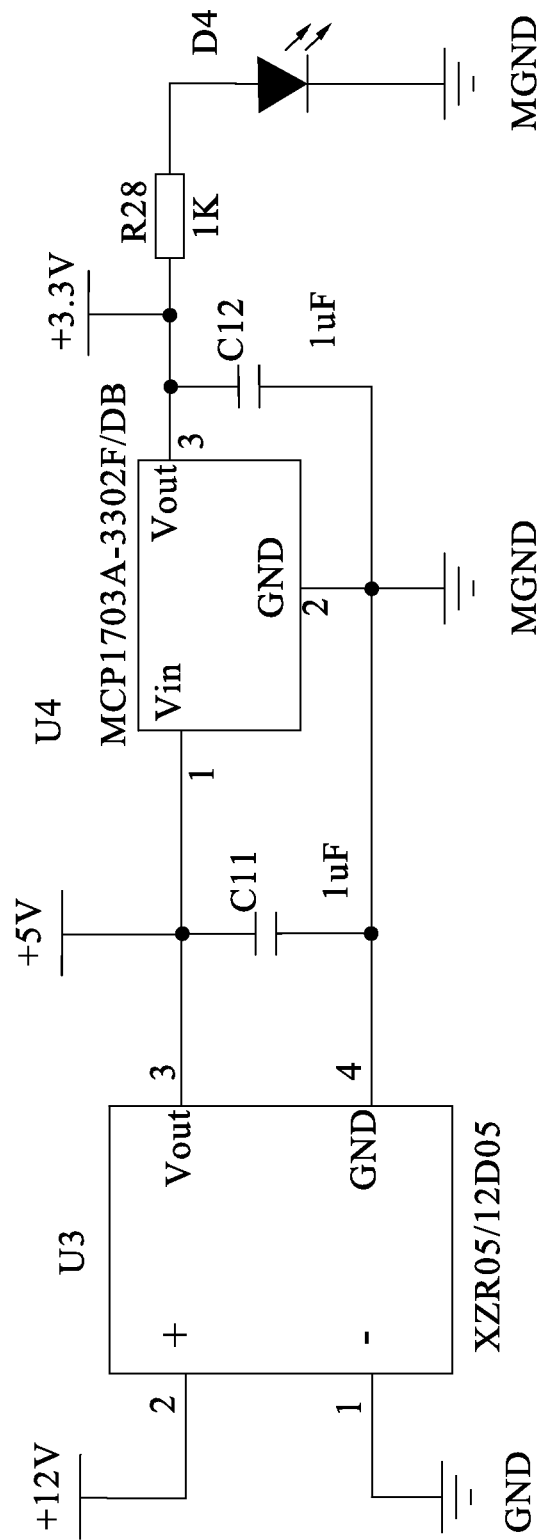
FIG. 4 is the diagram of the DC step-down module circuit in the embodiment of the present invention.

The DC step-down module circuit is shown in FIG. 4, comprising a +12V to +5V step-down chip and a +5V to 3.3V step-down chip, wherein the +12V to +5V step-down chip is a XZR05/12d05 type chip, i.e. a step-down module U3, and the +5V to 3.3V step-down chip is a MCP1703A-33-2E/DB type chip, i.e. a step-down module U4. Pin 2 of the step-down module U3 is connected with VPP, i.e. the +12V voltage obtained by the rectifier circuit is connected to pin 2 of the step-down module U3, pin 1 of the step-down module U3 is connected with GND, pin 3 of the step-down module U3 is connected with pin 1 of the step-down module U4, pin 4 of the step-down module U3 and pin 2 of the step-down module U4 are connected with MGND, and a filter capacitor C11 is connected in series between pins 3 and 4 of the step-down module U3. Pin 3 of the step-down module U4 is connected with MGMD through a resistor R28 and a light emitting diode D4, and pins 2 and 3 of the step-down module U4 are connected in series with a filter capacitor C12. A +3.3V voltage is supplied to the SCM and its peripheral devices. The DC step-down module circuit uses a two-stage step-down module, which can not only improve the stability of the +3.3V voltage and ensure a stable power supply for the SCM, but also supply power to other devices with the +5V voltage generated in the intermediate stage. In the circuit, the light emitting diode D4 has the function of +3.3V power indicating, and the capacitors have the function of filtering.

The SCM is provided with peripheral circuits including the operating condition indicating circuit, the external watchdog circuit, the interface circuit, the functional key circuit and the LED display circuit.

Figure 5:
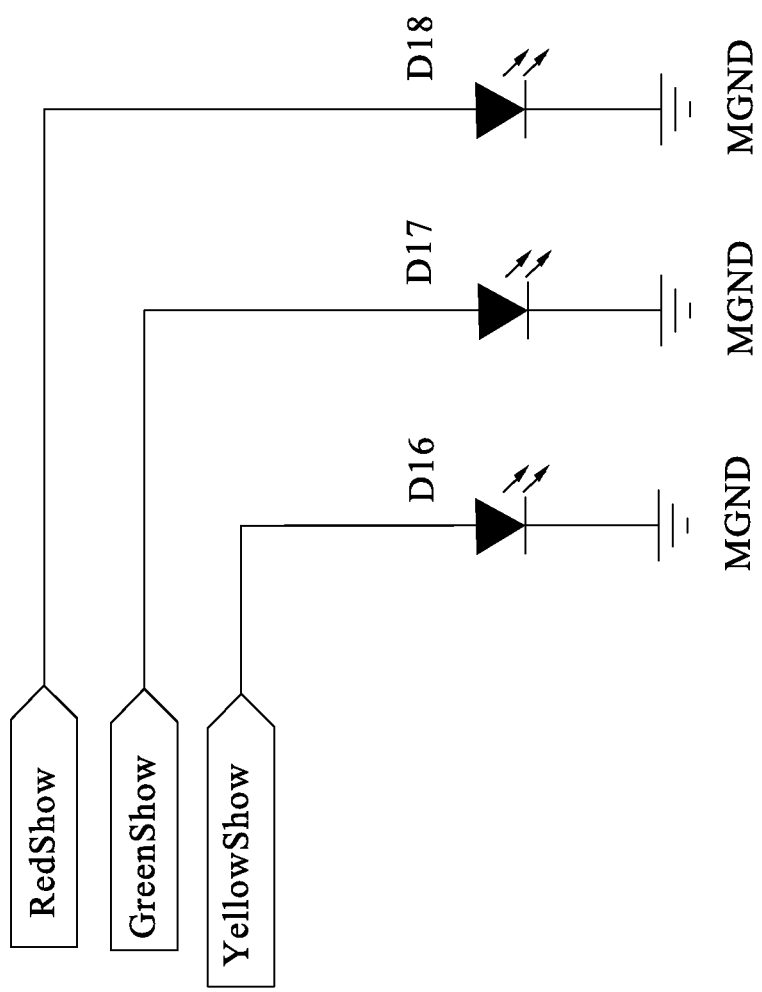
FIG. 5 is the diagram of the operating condition indicating circuit in the embodiment of the present invention.

The operating condition indicating circuit is shown in FIG. 5. The anodes of light emitting diodes D16, D17 and D18 are respectively connected with the three I/O ports of the SCM, and the cathodes of D16, D17 and D18 are connected with MGND. The light emitting diodes D16, D17 and D18 are respectively provided with yellow, green and red operating condition indicator lights to respectively indicate that the system detects grid voltage sag, normal grid voltage and abnormal operating condition of devices.

Figure 6:
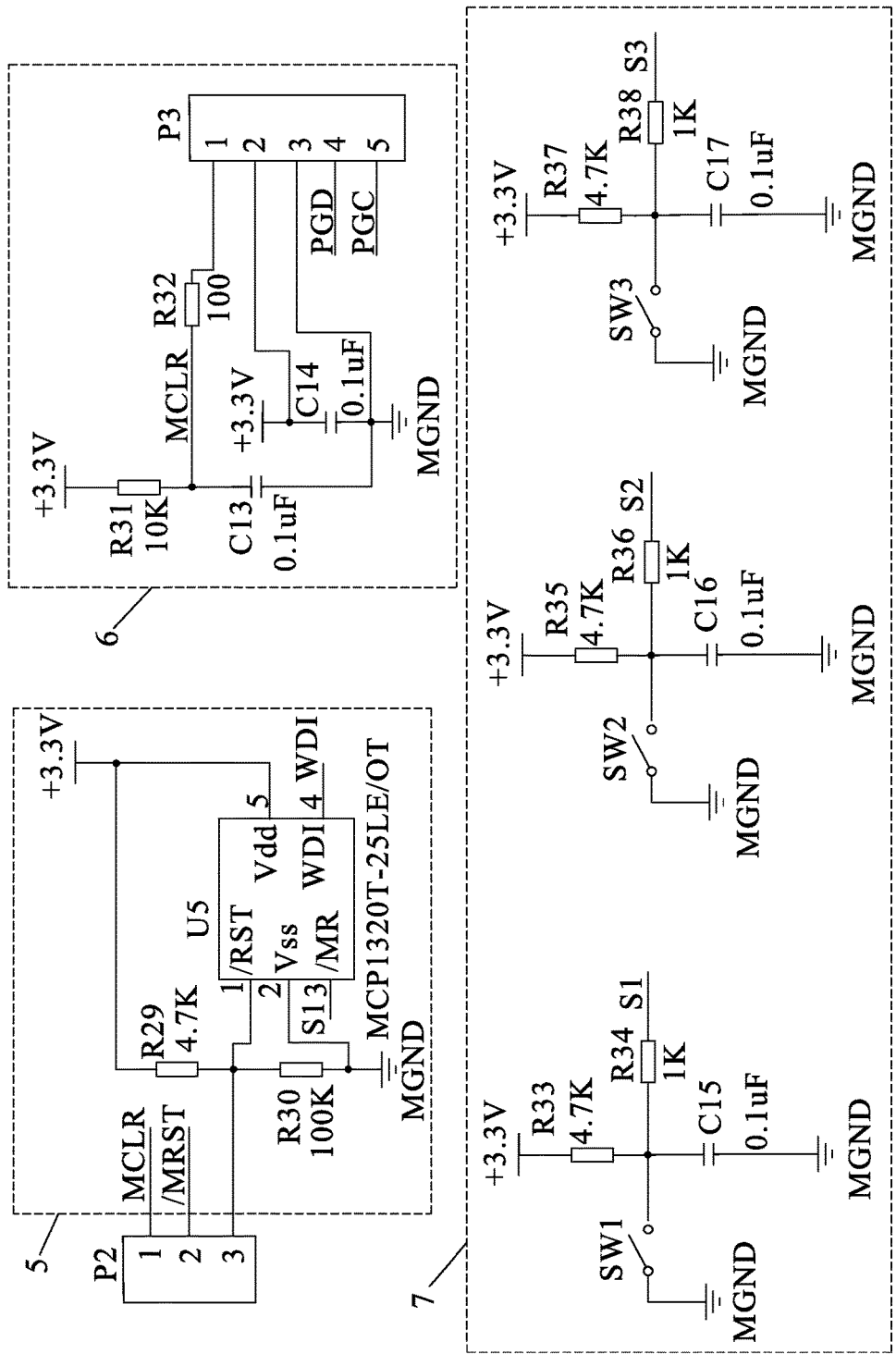
FIG. 6 is the diagram of the external watchdog circuit, interface circuit and functional key circuit in the embodiment of the present invention.

The external watchdog circuit, the interface circuit and the functional key circuit are shown in FIG. 6. The external watchdog circuit adopts a MCP1320T-25LE/OT type watchdog chip and has the function of monitoring the normal operation of programs. Pin 1 of a connector P2 used for connecting the external watchdog circuit 5 to the SCM is connected with the common end of resistors R31 and R32, pin 2 of the connector P2 is connected with the programming port of the SCM, and pin 3 of the connector P2 is connected with pin 1 of the watchdog chip U5. Pin 1 of the watchdog chip U5 is connected with +3.3V through a pull-up resistor R29, pins 1 and 2 of the watchdog chip U5 is connected in parallel with a resistor R30, pin 2 of the watchdog chip U5 is connected with MGND, pin 3 of the watchdog chip U5 is connected with 51 of R34 in a functional key SW1, pin 5 of the watchdog chip U5 is connected with +3.3V, and pin 4 of the watchdog chip U5 is connected with the input pin WDI on the SCM. Pin 1 of a connector P3 in the interface circuit 6 is connected with the other end of the resistor R32, pin 2 of the connector P3 is connected with +3.3V, and pins 4 and 5 of the connector P3 are respectively connected with PGD and PGC of the SCM; during program debugging, firstly form a short circuit between pins 1 and 2 of P2 by a jumper cap, then insert the interface of a program downloader into P3, and finally conduct program debugging to the software by operating a master computer program debugging software. The functional key circuit 7 has three function keys in total, which are SW1, SW2 and SW3; the functional key SW1 is the reset key of the SCM, and the other two functional keys are program variable control keys which can change the values of variables in the program when clicked. As the circuit diagrams of the three functional keys are the same, the circuit diagram of the functional key SW1 is taken as an example to make a detailed description; one end of the functional key SW1 is connected with MGND, the other end of the functional key SW1 is connected with the common end of R33 and R34, the other end of R33 is connected with +3.3V, the other end of R34 is an external output signal 51, and SW1 and the common end of R33 and R34 are connected with a grounded falterer capacitor C15. The external output signals of the functional keys SW2 and SW3 are respectively S2 and S3, and the two signals are input to the two pins of the SCM.

Figure 7:
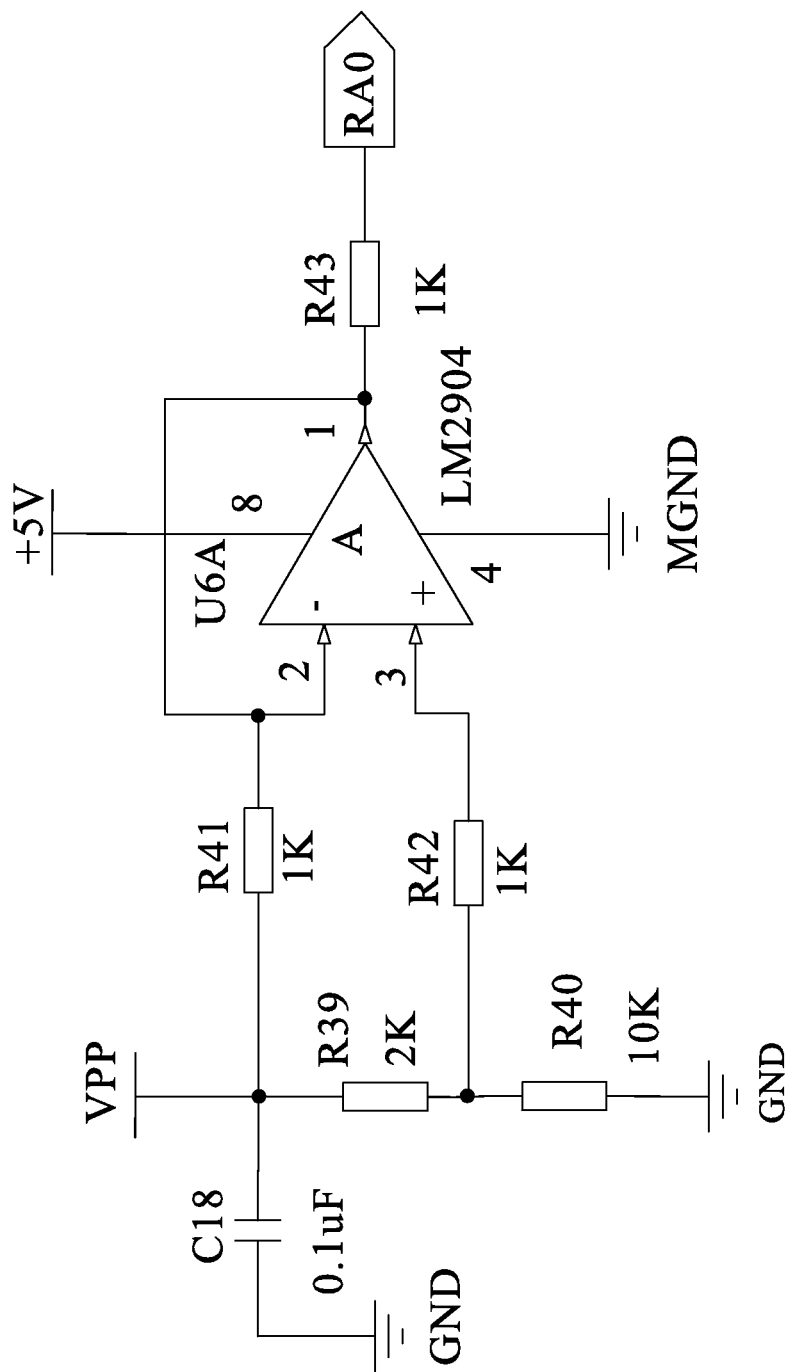
FIG. 7 is the diagram of the energy storage voltage detecting circuit in the embodiment of the present invention.

The energy storage voltage detecting circuit is shown in FIG. 7. Through voltage division and conditioning, the voltage VPP obtained by the AC-to-DC energy storage unit is converted into signals RA0 which can be input to the SCM, thus the voltage VPP can be monitored in real time and the normal operation of the equipment can be ensured. Resistors R39 and R40 are connected in series between VPP and GND, the common end of VPP and R39 is connected with pin 2 of an amplifier U6A (LM2904) through R41, the other end of R39 is connected in series with R40 and then connected with GND, and the common end of R39 and R40 is connected with pin 3 of the amplifier U6A through R42. Pins 1 and 2 of the amplifier U6A are directly connected, pin 1 of the amplifier U6A is connected in series with RA0 input to the SCM by R43, pin 5 of the amplifier U6A is connected with +5V, and pin 4 of the amplifier U6A is connected with MGND.

Figure 8:
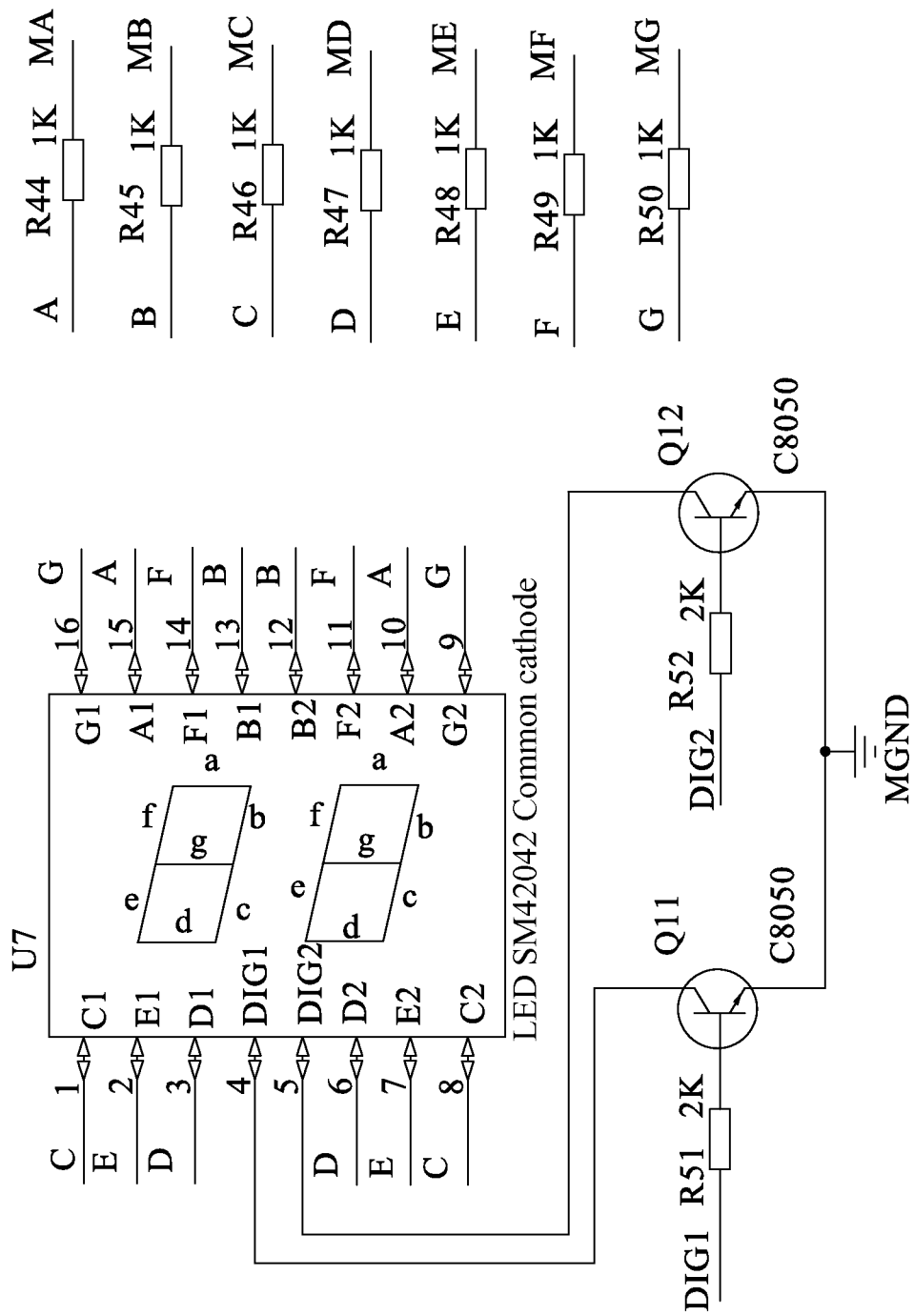
FIG. 8 is the diagram of the LED display circuit in the embodiment of the present invention.

The LED display circuit is shown in FIG. 8, comprising a LED SM42042 type common cathode nixie tube (U7) and two C8050 triodes (Q11 and Q12), wherein the nixie tube has two digits which are controlled by signals DIG1 and DIG2 to be displayed, and the content of each digit is controlled by using a multiplexed pin. Pin 10 (pin 15), pin 12 (pin 13), pin 1 (pin 8), pin 3 (pin 6), pin 2 (pin 7), pin 11 (pin 14) and pin 9 (pin 16) of U7 are respectively connected with pins A, B, C, D, E, F and G of R44, R45, R46, R47, R48, R49 and R50, and the other ends of R44, R45, R46, R47, R48, R49 and R50 are respectively connected with pins MA, MB, MC, MD, ME, MF and MG of the SCM. Pin 4 of U7 is connected with the collecting electrode of Q11, and the pin 5 of U7 is connected with the collecting electrode of Q12. The emitting electrodes of Q11 and Q12 are connected with the MGND. The base electrode of Q11 is connected with DIG1 of the SCM through R51, and the base electrode of Q12 is connected with DIG2 of the SCM through R52.

The inverter output unit comprises the high-frequency PWM generating circuit, the high-frequency transformer output circuit, the transformer output full-bridge rectifier circuit, the PWM generating circuit, the PWM driving and full-bridge inverter circuit, the 220V grid zero-cross point detecting circuit, the 220V grid voltage detecting circuit, the 220V grid and inversion AC converting circuit, and the signal interface circuit.

The input end of the high-frequency PWM generating circuit is connected with the output end of the quick tank circuit, one output end of the high-frequency PWM generating circuit is connected with the input end of the DC step-down module circuit, the other output end of the high-frequency PWM generating circuit is connected with one input end of the high-frequency transformer output circuit, the other input end of the high-frequency transformer output circuit is connected with the output end of the quick tank circuit, the output end of the high-frequency transformer output circuit is connected with the input end of the transformer output full-bridge rectifier circuit, the output end of the transformer output full-bridge rectifier circuit is connected with one input end of the PWM driving and full-bridge inverter circuit, the output end of the PWM driving and full-bridge inverter circuit is connected with one input end of the 220V grid and inversion AC converting circuit, the other two input ends of the PWM driving and full-bridge inverter circuit are respectively connected with the output end of the PWM generating circuit and the enable port of the SCM, the input end of the PWM generating circuit is connected with the signal output port of the SCM, the other two input ends of the 220V grid and inversion AC converting circuit are respectively connected with the signal output end of the SCM and the 220V grid, the output end of the 220V grid and inversion AC converting circuit is connected with a load, the input end of the 220V grid zero-cross point detecting circuit and the input end of the 220V grid voltage detecting circuit are respectively connected with the 220V grid, and the output end of the 220V grid zero-cross point detecting circuit and the output end of the 220V grid voltage detecting circuit are respectively connected with different signal input ends of the SCM.

Figure 9:
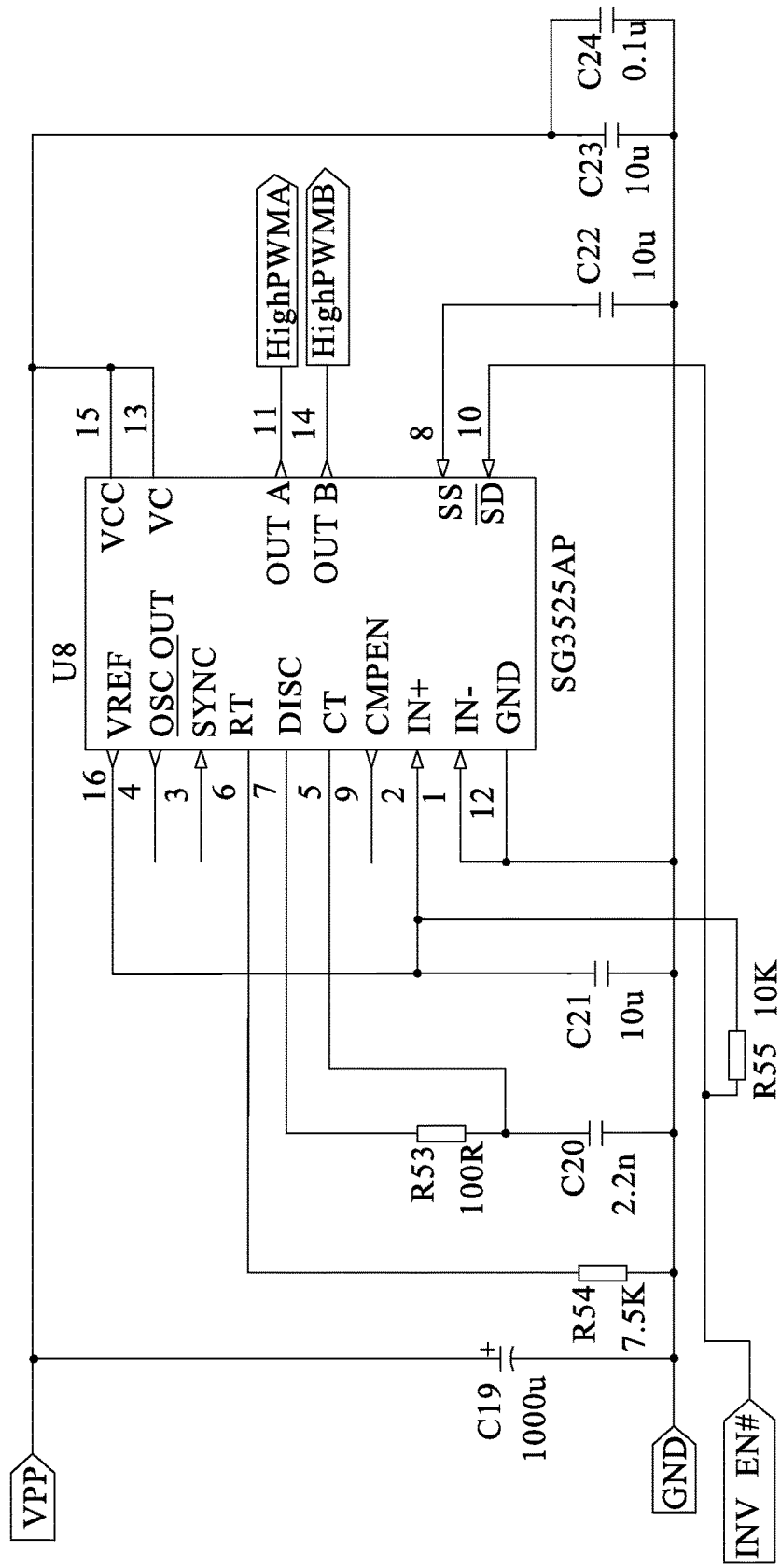
FIG. 9 is the diagram of the high-frequency PWM generating circuit in the embodiment of the present invention.

The high-frequency PWM generating circuit is shown in FIG. 9, comprising a SG3525AP high-frequency PWM generating chip (U8). Filter capacitors C19, C23 and C24 are connected in parallel between VPP and GND. Pins 1 and 12 of U8 are directly connected with GND, pins 2 and 16 of U8 are directly connected, pin 2 of U8 is connected in series with a capacitor C21 and then connected with GND, pin 2 of U8 is connected in series with a resistor R55 and then connected with pin 10, pin 7 of U8 is connected in series with R53 and C20 and then connected with GND, pin 5 of U8 is connected with the common end of R53 and C20, pin 6 of U8 is connected in series with R54 and then connected with GND, pin 8 of U8 is connected in series with C22 and then connected with GND, pin 10 of U8 is connected with an input signal INV_EN#, pins 13 and 15 of U8 are connected with VPP, pin 11 of U8 outputs a signal HighPWMA, pin 14 of U8 outputs a signal HighPWMB, this two high-frequency PWM signals are input to the high-frequency transformer output circuit, and the other pins are suspended and not connected.

Figure 10:
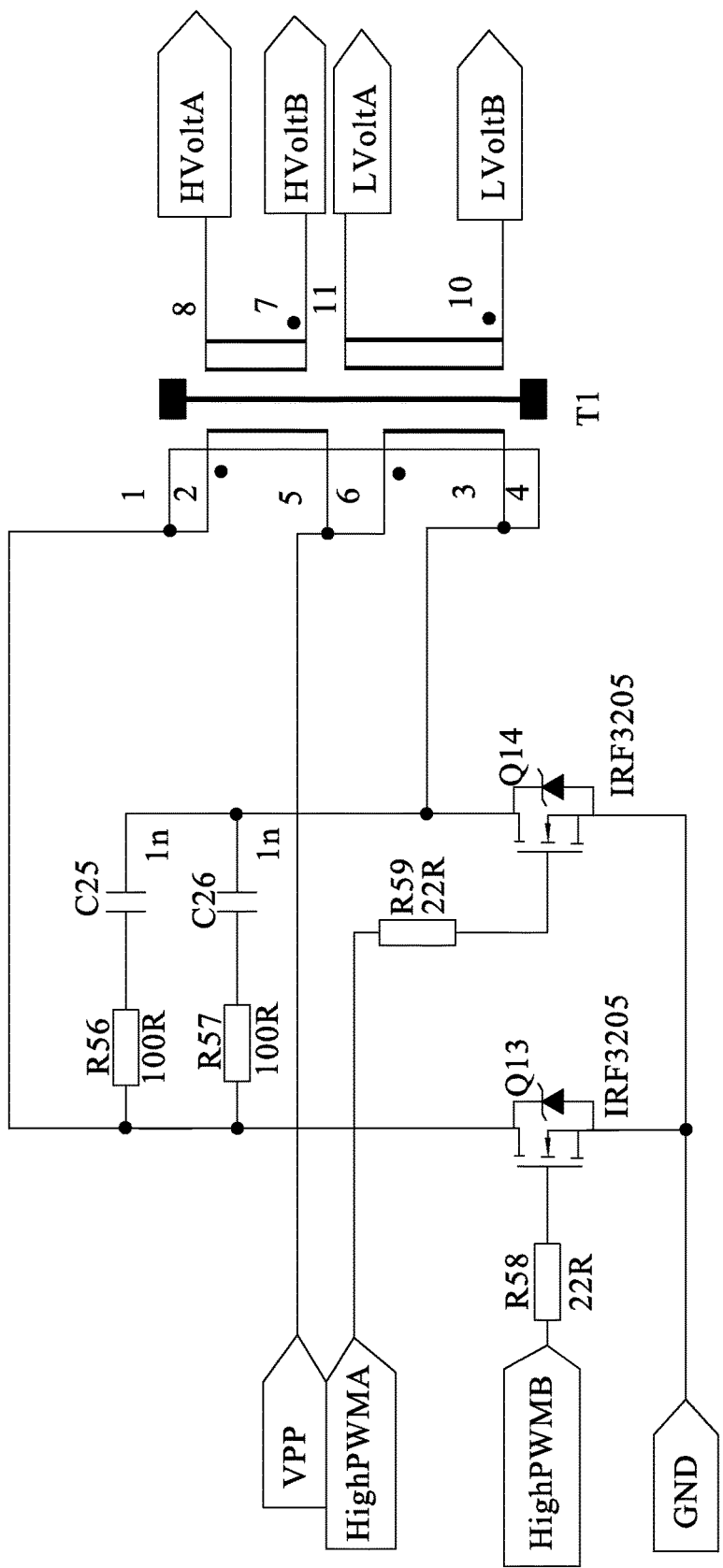
FIG. 10 is the diagram of the high-frequency transformer output circuit in the embodiment of the present invention.

The high-frequency transformer output circuit is shown in FIG. 10. The on/off of Q14 and Q13 are controlled under the action of the complementary push-pull HighPWMA and HighPWMB, the signal VPP is chopped into high-frequency voltage under the drive of Q13 and Q14, and two branches of voltages including a branch of high-voltage AC signals HVoltA and HVoltB and a branch of low-voltage AC signals LVoltA and LVoltB are output under the action of a high-frequency transformer. These two branches of signals are input to the transformer output full-bridge rectifier circuit. The output signal HighPWMA of U8 is connected with the gate electrode of the triode Q14 through R59, HighPWMB is connected with the gate electrode of the triode Q13 through R58, the drain electrode of the triode Q13 is connected with pins 1 and 2 of the high-frequency transformer T1, the drain electrode of the triode Q14 is connected with pins 3 and 4 of the high-frequency transformer T1, the series circuit formed by R56 and C25 is connected in parallel with the series circuit formed by R57 and C26, this parallel circuit is connected in series between the drain electrodes of the triode Q13 and the triode Q14, pins 5 and 6 of the high-frequency transformer T1 is connected with VPP, pins 7 and 8 of the of the high-frequency transformer T1 outputs a high level AC voltage with the symbols of HVoltB and HVoltA on both ends respectively, and pins 10 and 11 of the of the high-frequency transformer T1 outputs a low AC voltage with the symbols of LVoltB and LVoltA on both ends respectively.

Figure 11:
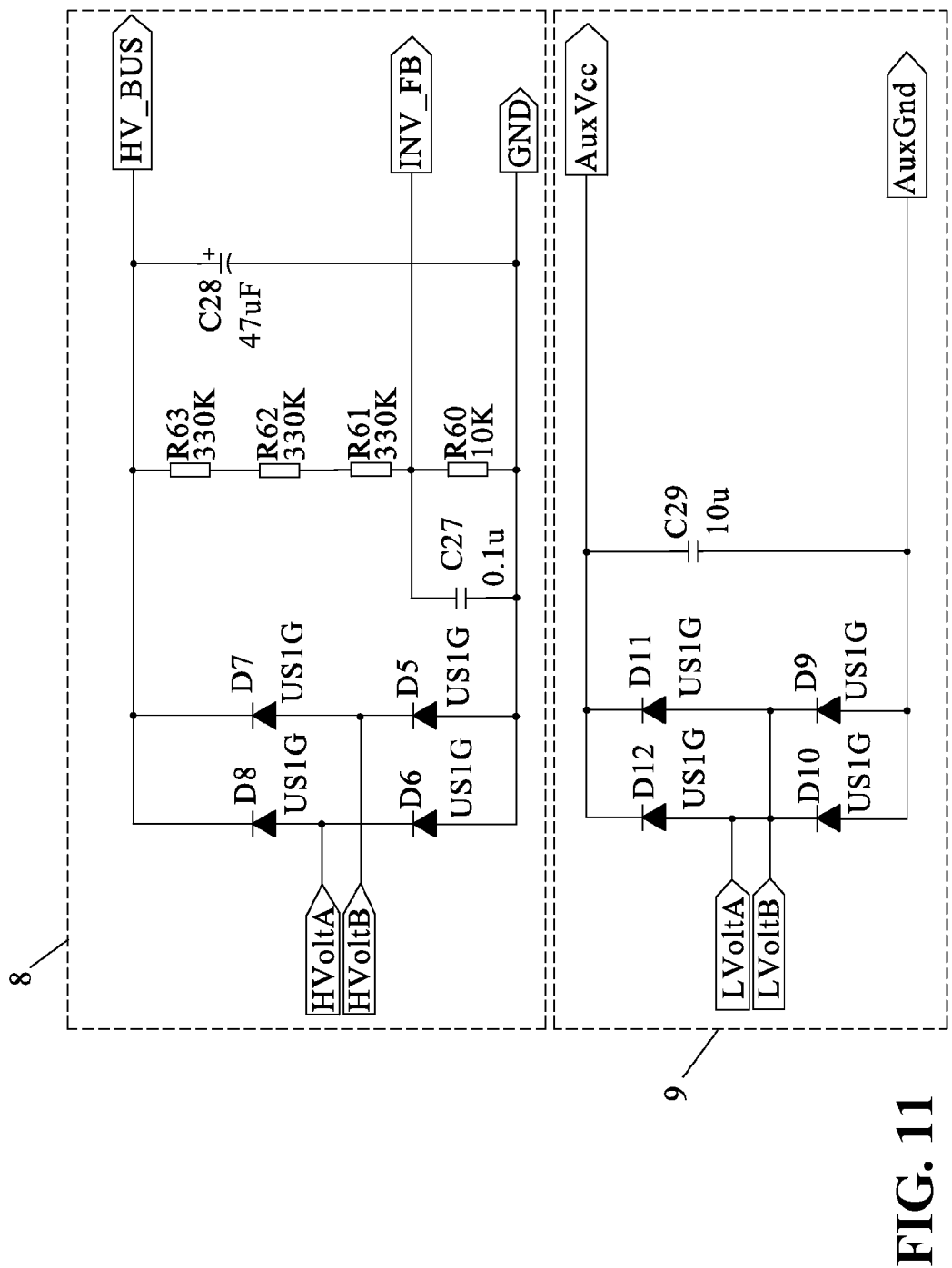
FIG. 11 is the diagram of the transformer output full-bridge rectifier circuit in the embodiment of the present invention.

The transformer output full-bridge rectifier circuit is shown in FIG. 11, comprising the rectifier circuit 8 of high level AC voltage and the rectifier circuit 9 of low AC voltage. The specific wiring condition of the rectifier circuit 8 of high level AC voltage is as follows: rectifier diodes D6 is connected in series with D8, D5 is connected in series with D7, this two series circuits are connected in parallel to form a full-bridge rectifier circuit, signal HVoltA is connected with the common end of D6 and D8, signal HVoltB is connected with the common end of D5 and D7, the common end of D7 and D8 outputs a signal HV_BUS, the common end of D5 and D6 outputs a signal GND, resistors R60, R61, R62 and R63 are connected in series between HV_BUS and GND, one end of R60 is connected with GND, the other end of R60 with is not connected with GND outputs a signal INV_FB, C27 is connected between INV_FB and GND, and C28 is connected between HV_BUS and GND. The specific wiring condition of the rectifier circuit 9 of low level AC voltage is as follows: rectifier diode D10 is connected in series with D12, D9 is connected in series with D11, this two series circuits are connected in parallel to form a full-bridge rectifier circuit, signal LVoltA is connected with the common end of D10 and D12, signal LVoltB is connected with the common end of D9 and D11, the common end of D11 and D12 outputs a signal AuxVcc, the common end of D9 and D11 outputs a signal AuxGnd, and a filter capacitor C29 is connected between AuxVcc and AuxGnd. The high-voltage AC signals HVoltA and HVoltB are rectified into high-voltage DC signals HV_BUS and GND under the action of the full bridge formed by D5, D6, D7 and D8. The high-voltage DC signals are converted into proportionally reduced small DC signals by the principle of resistor voltage division, and these small DC signals are input to the SCM to monitor the high-voltage DC signals. The high-voltage DC signals serve as the input of a full-bridge inverter circuit and is converted into 220V AC signals. The low-voltage AC signals LVoltA and LVoltB are rectified into low-voltage DC signals AuxVcc and AuxGND under the action of the full bridge formed by D9, D10, D11 and D12, and these low-voltage DC signals are used for supplying power to the 220V grid zero-cross point detecting circuit and the 220V grid voltage detecting circuit.

Figure 12:
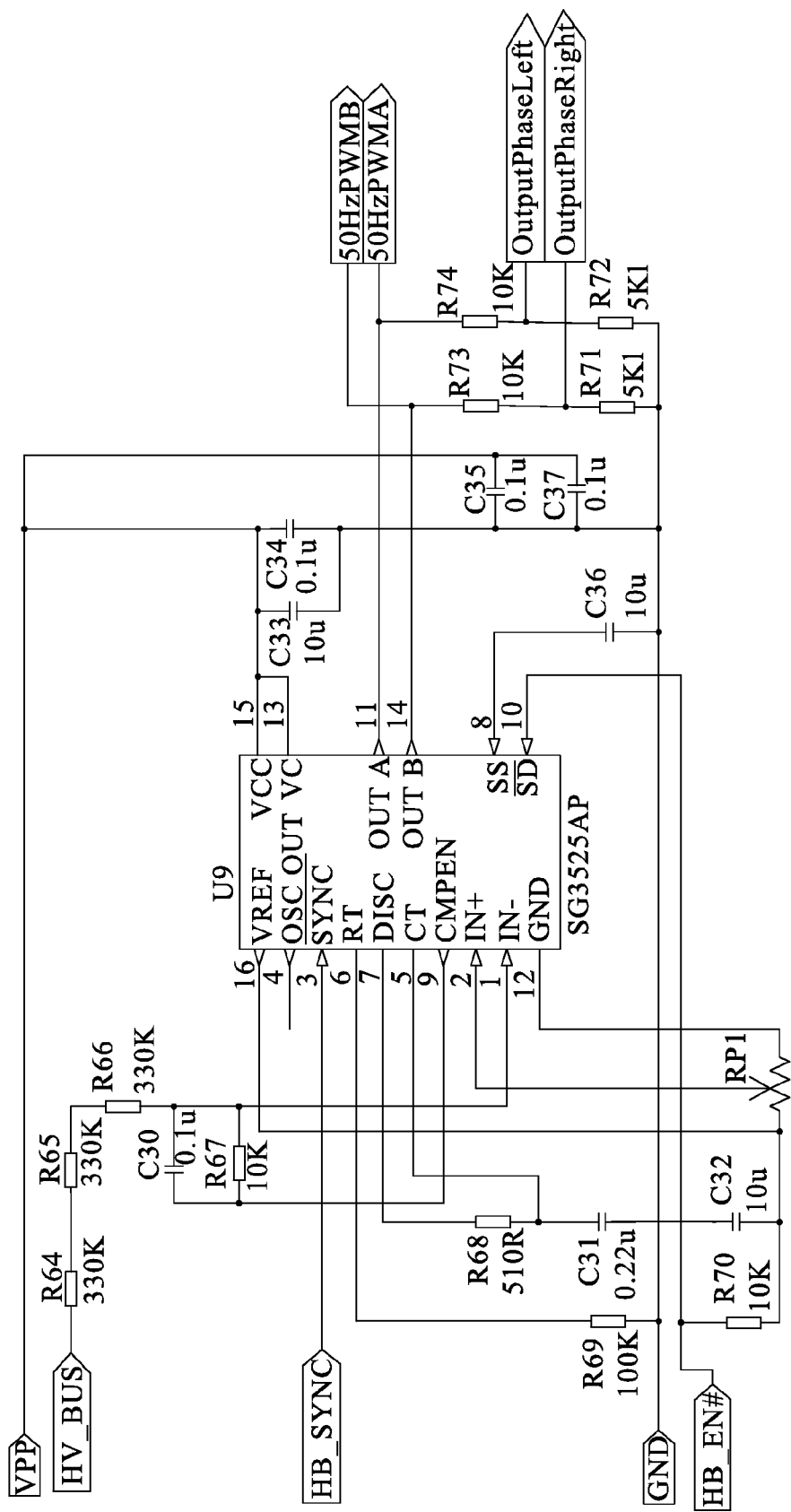
FIG. 12 is the diagram of the PWM generating circuit in the embodiment of the present invention.

PWM generating circuit is shown in FIG. 12, comprising a SG3525AP high-frequency PWM generating chip (U9). Pin 1 of a sliding rheostat RP1 is connected with pin 16 of U9, pin 3 of RP1 is connected with GND, and pin 2 of RP1 is connected with pin 2 of U9. Pin 1 of U9 is connected in series with three resistors R64, R65 and R66 and then connected with HV_BUS, R67 is connected in parallel with C30 and then connected in series between pins 1 and 9 of U9. Pin 3 of U9 is connected with the signal HB_SYNC, pin 7 of U9 is connected in series with R68 and C31 and then connected with GND, pin 5 of U9 is connected with the common end of R68 and C31, pin 6 of U9 is connected in series with R69 and then connected with GND, pin 8 of U9 is connected in series with C36 and then connected with GND, pin 10 of U9 is connected with the signal HB_EN#, R70 and C32 are connected in series between pin 10 of U9 and GND, the common end of R70 and C32 is connected with pin 16, pins 13 and 15 are connected with VPP, pin 11 of U9 outputs a signal PWMA, pin 14 of U9 outputs a signal PWMB, R74 and R72 are connected in series between pin 11 of U9 and GND, one end of R72 is connected with GND, the other end of R72 outputs a signal OutputPhaseLeft, R73 and R71 are connected in series between pin 14 of U9 and GND, one end of R71 is connected with GND, and the other end of R71 outputs a signal OutputPhaseRight. Some filter capacitors are connected between VPP and GND. When pin 3 of U9 does not output a synchronizing pulse, regulate the triangular wave generated by RC oscillation through setting the sizes of the capacitor connected with pin 5 of U9 and the resistor connected with pin 7, thus ensuring that the output PWM frequencies of pins 11 and 14 of U9 are between 60 Hz and 80 Hz. Under the action of a 100 Hz synchronizing pulse, Pin 3 of U9 ensures that pins 11 and 14 output PWM waveform signals PWMA and PWMB which are 50 Hz and complementary. On the one hand, signals PWMA and PWMB are converted into PWM waveform signals Output-PhaseLeft and OutputPhaseRight with proportionally reduced amplitude by the principle of resistor voltage division, and this two signals are input to the SCM to achieve the purpose of detecting the phase of inverter output; On the other hand, this two signals are input to the PWM driving and full-bridge inverter circuit. The signal HB_EN# can enable U9.

Figure 13:
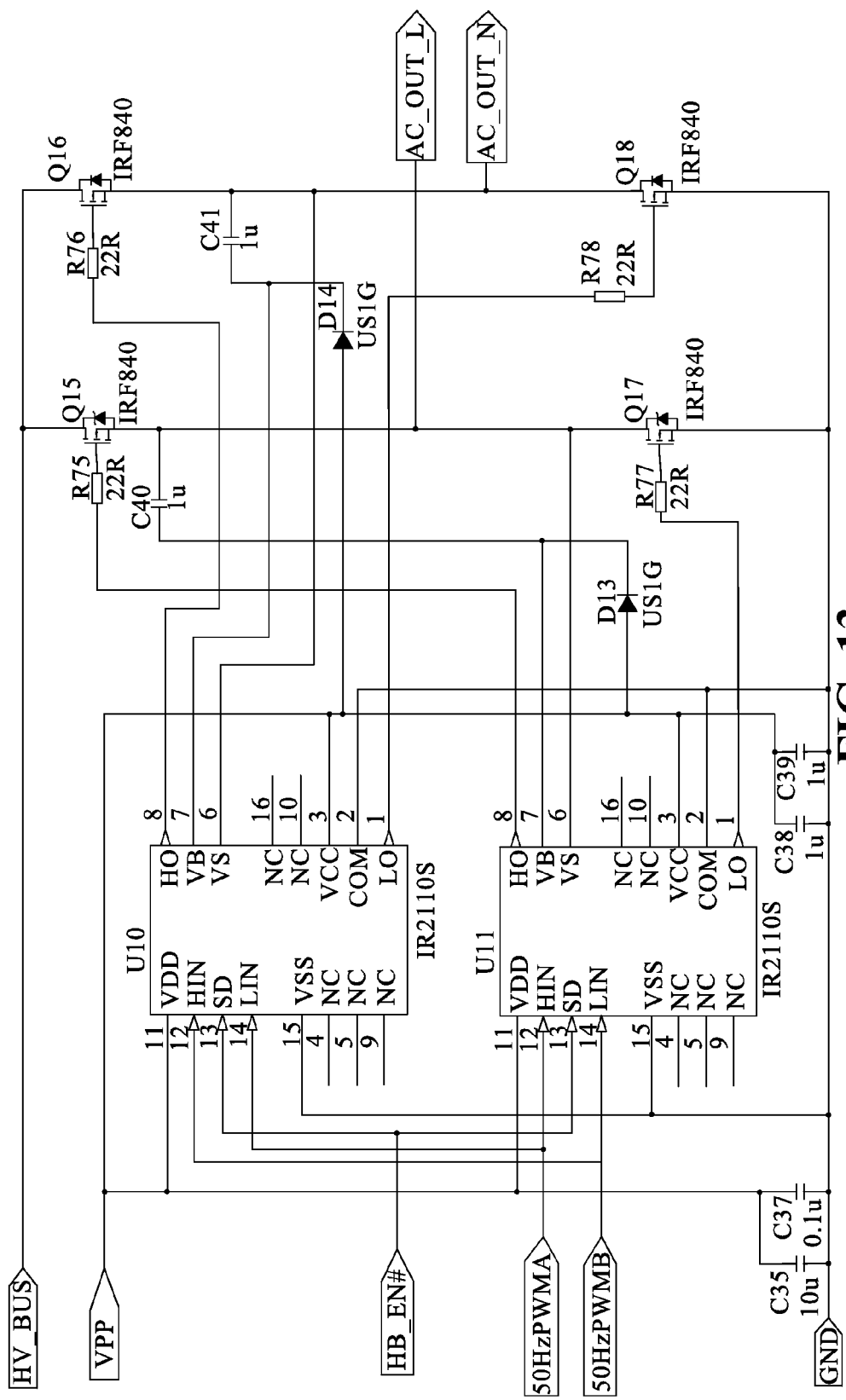
FIG. 13 is the diagram of the PWM driving and full-bridge inverter circuit in the embodiment of the present invention.

The PWM driving and full-bridge inverter circuit is shown in FIG. 13. An MOS transistor Q15 is connected in series with an MOS transistor Q17, an MOS transistor Q16 is connected in series with a MOS transistor Q18, this two series circuit are connected in parallel to form a MOS transistor full-bridge inverter circuit, the common end of Q15 and Q16 is connected with HV_BUS, the common end of Q17 and Q18 is connected with GND, the common end of Q15 and Q17 outputs a signal AC_OUT_L, and the common end of Q16 and Q18 outputs a signal AC_OUT_N. Pins 3 and 11 of U10 and U11 are connected with VPP, pins 2 and 15 are connected with GND, the signal HB_EN# is connected with pins 13 of U10 and U11, the signal PWMA is connected with pin 14 of U10 and pin 12 of U11, and the signal PWMB is connected with pin 12 of U10 and pin 14 of U11. Pin 1 of U10 is connected with the gate electrode of Q18 through R78, and pin 8 of U10 is connected with the gate electrode of Q16 through R76. Pin 1 of U11 is connected with the gate electrode of Q17 through R77, and pin 8 of U11 is connected with the gate electrode of Q15 through R75. C41 is connected in series between pin 7 of U10 and the source electrode of Q16, and a diode D14 is connected in series between pins 3 and 7 of U10 forwardly. C40 is connected in series between pin 7 of U11 and the source electrode of Q15, and a diode D13 is connected in series between pins 3 and 7 of U11 forwardly. Some filter capacitors are connected in series between VPP and GND. This circuit uses two drive chips IR2110S, the input PWMA and PWMB signals are respectively converted into two branches of complementary PWM signals which can drive the IRF840 MOS transistors, the full-bridge inverter circuit formed by the four IRF840 MOS transistors Q15, Q16, Q17 and Q18 is driven by the four branches of PWM signals to invert HB_BUS voltage and obtain a 220V AC voltage.

Figure 14:
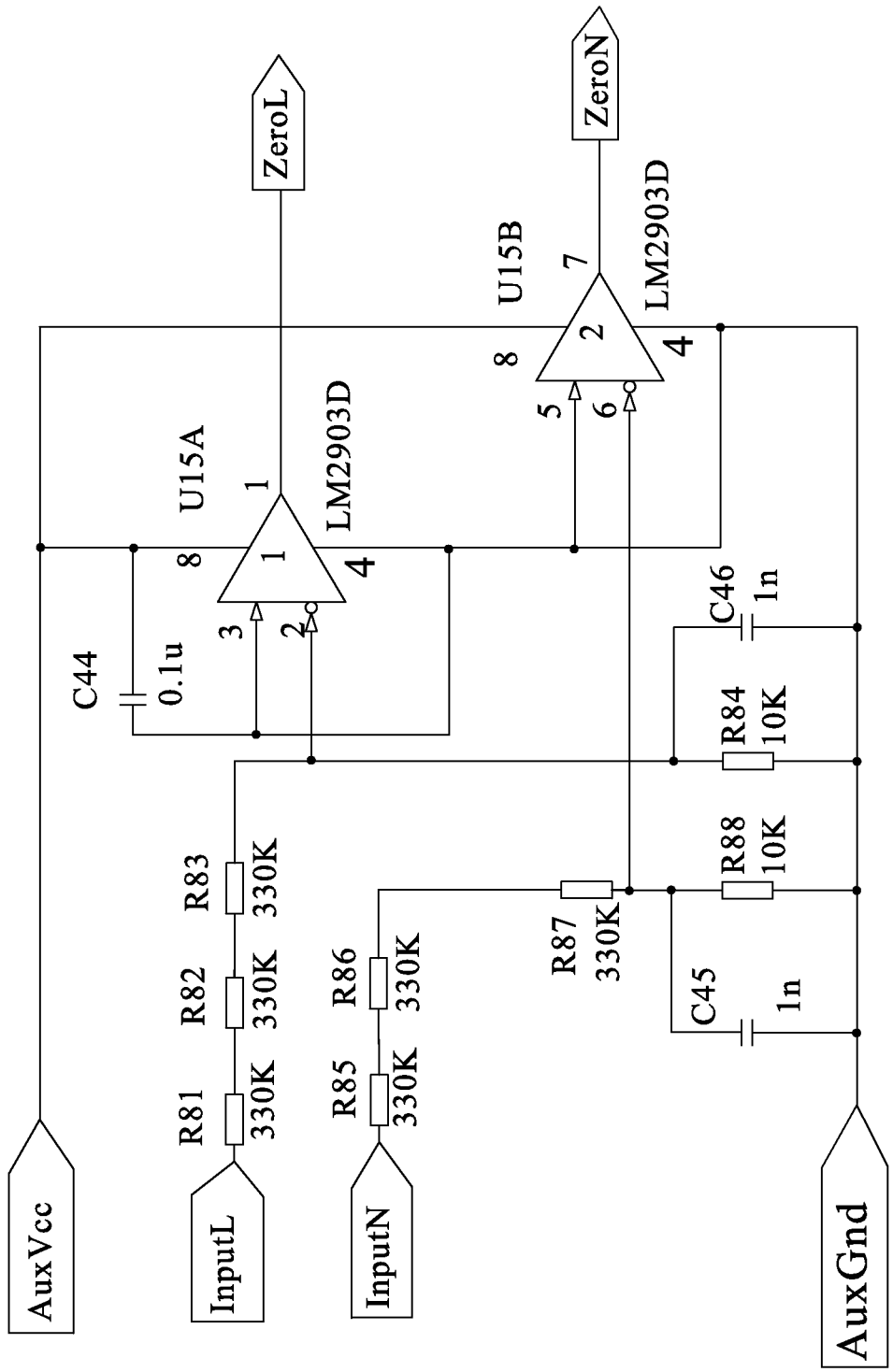
FIG. 14 is the diagram of the 220V grid zero-cross point detecting circuit in the embodiment of the present invention.

The 220V grid zero-cross point detecting circuit is shown in FIG. 14. Resistors R81, R82, R83 and R84 are connected in series between the signals InputL and AuxGnd of the 220V grid, one end of R84 is connected with AuxGnd, the other end of R84 is connected with pin 2 of U15A, and a capacitor C46 is connected in parallel with R84 by both ends. Resistors R85, R86, R87 and R88 are connected in series between the signals InputN and AuxGnd of the 220V grid, one end of R88 is connected with AuxGnd, the other end of R84 is connected with pin 6 of U15B, and a capacitor C45 is connected in parallel with R88 by both ends. Pins 3 and 4 of U15A are connected and grounded, pin 8 of U15A is connected with AuxVcc, a capacitor C44 is connected in series between pins 3 and 8, and pin 1 of U15A outputs a signal ZeroL. Pins 4 and 5 of U15B are connected and grounded, pin 8 of U15B is connected with AuxVcc, and pin 7 of U15B outputs a signal ZeroN. The two branches of signals InputL and InputN input by the 220V grid are converted into two branches of proportionally reduced signals by the principle of resistor voltage division. The proportionally reduced signals of InputL obtain a group of square wave signals ZeroL at pin 1 under the action of a comparator LM2903D. The proportionally reduced signals of InputN obtain a group of square wave signals ZeroN at pin 7 under the action of a comparator LM2903D. Since the phases of the input signals of the two comparators differ by 180°, the obtained square wave signals ZeroL and ZeroN differ by 180°. By capturing the rising edges of signals ZeroL and ZeroN, the SCM can determine the positions of two zero-cross points of the 220V grid in one cycle, thus determining the phase of the 220V grid.

Figure 15:
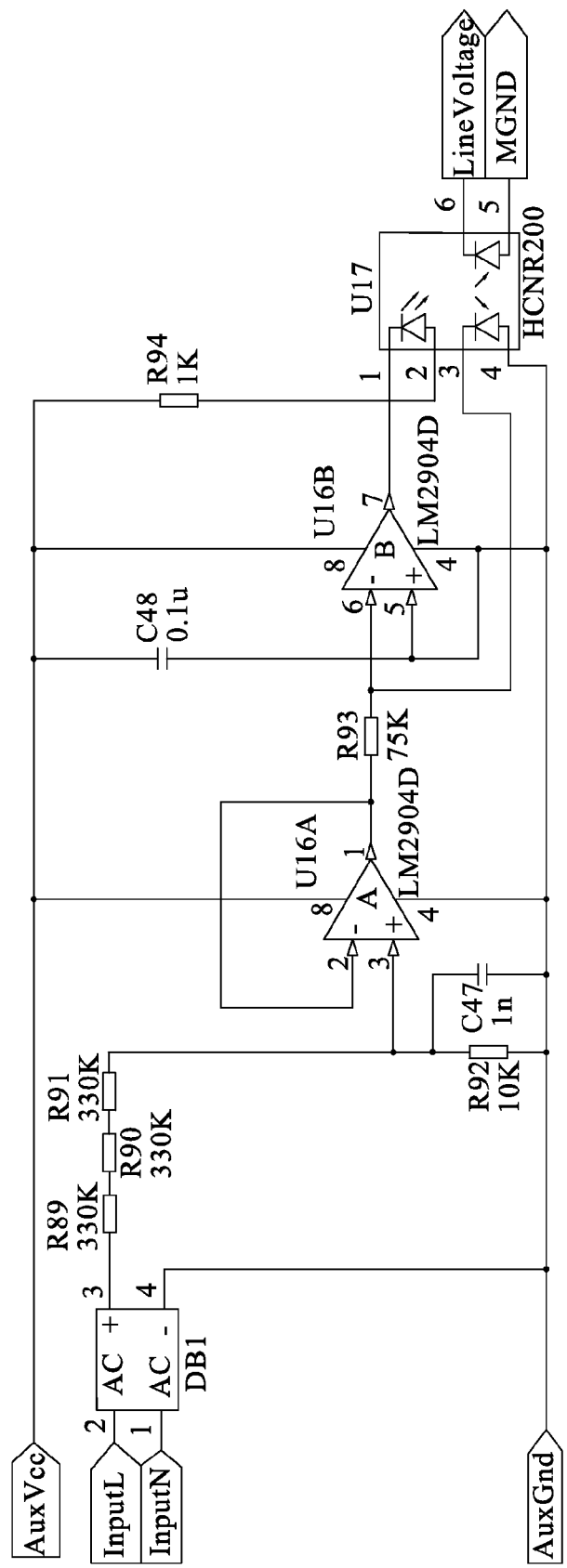
FIG. 15 is the diagram of the 220V grid voltage detecting circuit in the embodiment of the present invention.

The 220V grid voltage detecting circuit is shown in FIG. 15. Pin 1 of an integrated rectifier bridge module DB1 is connected with InputN, pin 2 of DB1 is connected with the signal InputL, pin 3 of DB1 is connected in series with R89, R90, R91 and R92 and then connected with AuxGnd, one end of R92 is connected with AuxGnd, the other end of R92 is connected with pin 3 of U16A (a LM2904D type amplifier), and R92 is connected in parallel with C47 by both ends. Pin 8 of U16A is connected with AuxVcc, pin 4 of U16A is connected with AuxGnd, pins 1 and 2 of U16A are directly connected and then connected in series with R93, the other end of R93 is connected with pin 6 of U16B and pin 3 of U17, pin 8 of U16B (a LM2904D type amplifier) is connected with AuxVcc, pins 4 and 5 of U16B are directly connected and then connected with AuxGnd, C48 is connected in series between pin 5 of U16B and AuxVcc, and pin 7 of U16B is connected with pin 1 of U17. Pin 2 of U17 is connected with AuxVcc through R94, pin 4 of U17 is connected with AuxGnd, pin 5 of U17 is connected with MGND, and pin 6 of U17 outputs a signal LineVoltage. The two branches of signals InputL and InputN input by the 220V grid obtain a bread wave under the action of the integrated rectifier bridge module DB1, this bread wave is input to the operational amplifiers U16A and U16B for conditioning after voltage division, the conditioned signals are input to the linear optocoupler U17 which is HCNR200 type. The linear optocoupler obtains a weak electrical signal which is in direct proportion to the 220V grid, and this weak electrical signal is input to the signal interface circuit for treatment.

Figure 16:
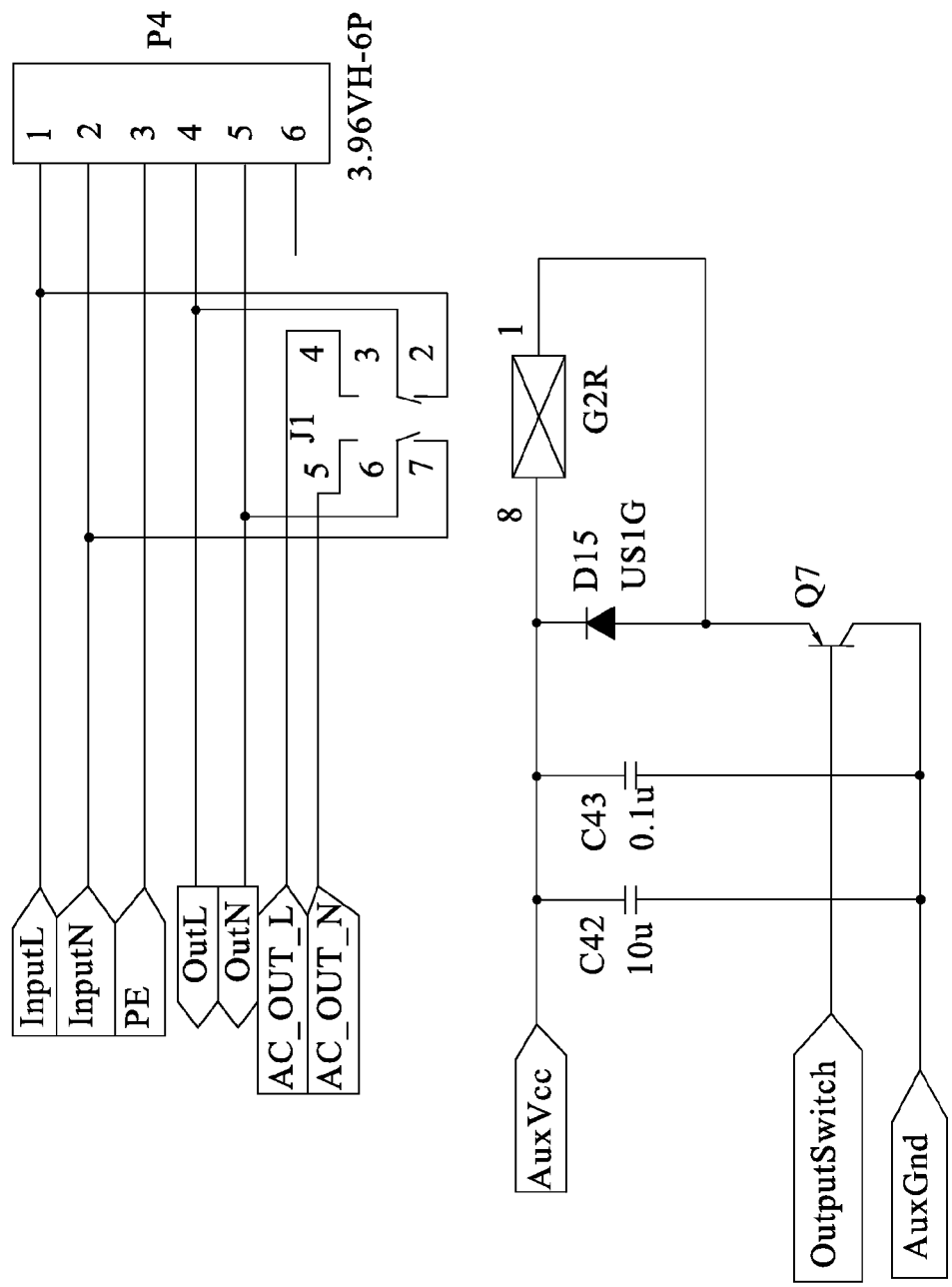
FIG. 16 is the diagram of the 220V grid and inversion AC converting circuit in the embodiment of the present invention.

The 220V grid and inversion AC converting circuit is shown in FIG. 16. Pins 1 and 2 of a connector P4 are respectively connected with InputL and InputN of the 220V grid, pin 3 is connected with a mask signal PE, pins 4 and 5 of the connector P4 are respectively connected with pins 3 and 6 of a double-pole double-throw switch J1, and pin 6 of the connector P4 is suspended. Pin 4 of J1 is connected with a signal AC_OUT_L, pin 5 of J1 is connected with a signal AC_OUT_N, pins 2 and 7 of J1 are respectively connected with pins 1 and 2 of P4, pin 8 of J1 is connected with AuxVcc, pin 1 of J1 is connected with the emitting electrode of Q7, and a backward diode D15 is connected in parallel between pins 8 and 1 of J1. The collecting electrode of Q7 is connected with AuxGnd, and the base electrode is connected with a signal OutputSwitch. A filter capacitor is connected between AuxVcc and AuxGnd. The connector P4 is used as the interface between the input of the 220V grid and the output of the load power supply, the switching control signals output by the SCM control the on/off of a triode Q7, and the double-pole double-throw switch J1 is controlled by controlling the on/off of Q7 to switch between the 220V grid and an inversion alternate current. The backward diode D15 connected in parallel in the figure has the function of afterflow to ensure that the energy in the control coil of the double-pole double-throw switch can be released when Q17 is cut off.

In the embodiment, there is also an optocoupler isolating circuit used for isolating all the signals entering and leaving the SCM. All the signals input to and output from the SCM are isolated by the optocoupler isolating circuit, thus to prevent the operation of the SCM from being interfered by the noise in input and output signals, ensure the operating stability of the SCM, and improve the reliability of the system.

Figure 17:
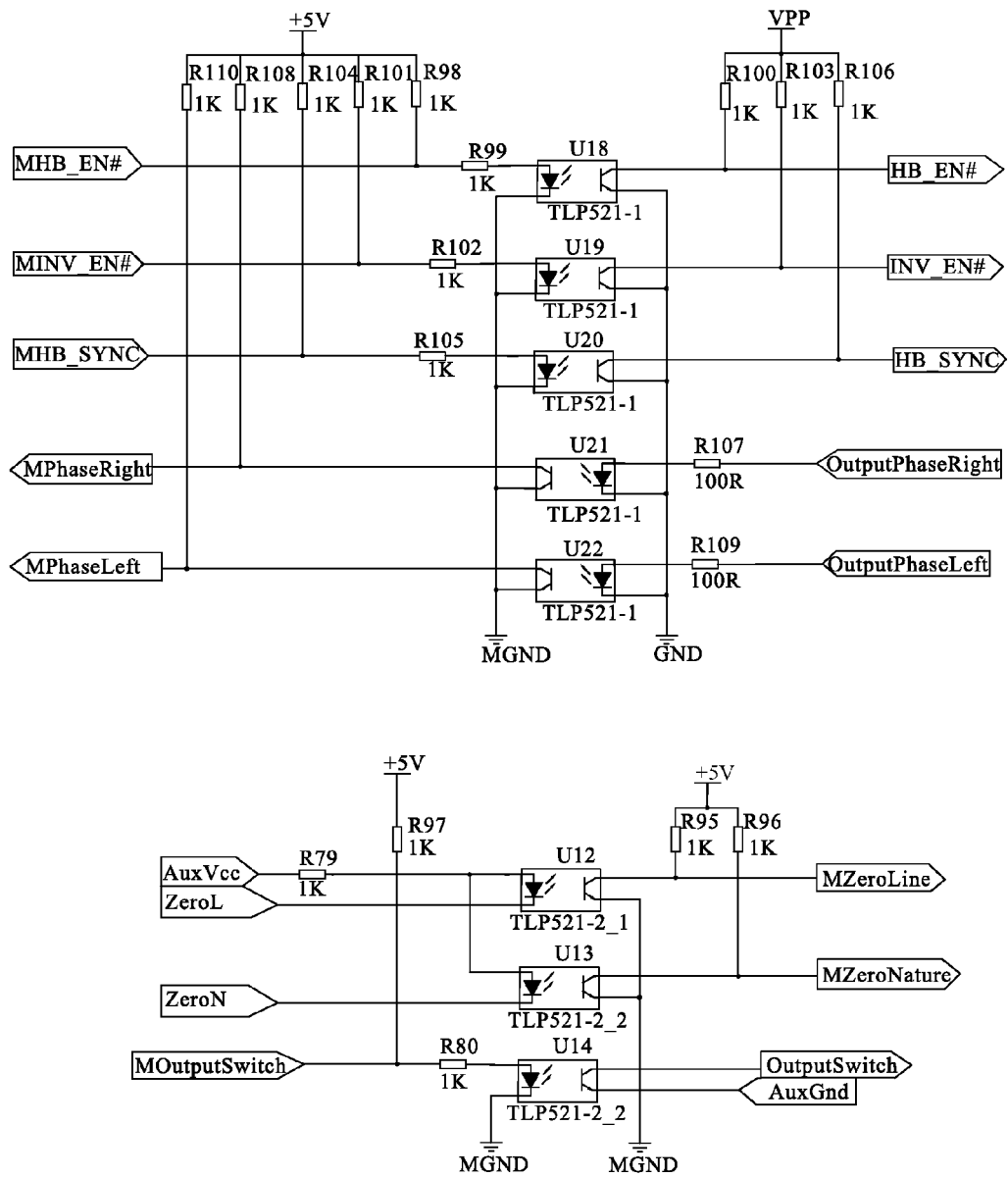
FIG. 17 is the diagram of the optocoupler isolating circuit in the embodiment of the present invention.

As shown in FIG. 17, the optocoupler isolating circuit is connected as follows: A signal MHB_EN# is connected with +5V through a pull-up resistor R98 and connected with pin 1 of an optocoupler U18 through R99, pin 2 of the optocoupler U18 is connected with MGND, pin 3 of the optocoupler U18 is connected with GND, and pin 4 of the optocoupler U18 is connected with VPP through a pull-up resistor R100 and outputs a signal HB_EN#. A signal MINV_EN# is connected with +5V through a pull-up resistor R101 and connected with pin 1 of an optocoupler U19, pin 2 of the optocoupler U19 is connected with MGND, pin 3 of the optocoupler U19 is connected with GND, and pin 4 of the optocoupler U19 is connected with VPP through a pull-up resistor R103 and outputs a signal INV_EN#. A signal MHB_SYNC is connected with +5V through a pull-up resistor R104 and connected with pin 1 of an optocoupler U20 through R105, pin 2 of the optocoupler U20 is connected with MGND, pin 3 of the optocoupler U20 is connected with GND, and pin 4 of the optocoupler U20 is connected with VPP through a pull-up resistor R106 and outputs a signal HB_SYNC. A signal OutputPhaseRight is connected with pin 1 of an optocoupler U21 through R107, pin 2 of the optocoupler U21 is connected with GND, pin 3 of the optocoupler U21 is connected with MGND, and pin 4 of the optocoupler U21 is connected with +5V through a pull-up resistor R108 and outputs a signal MPhaseRight. A signal OutputPhaseLeft is connected with pin 1 of an optocoupler U22 through R109, pin 2 of the optocoupler U22 is connected with GND, pin 3 of the optocoupler U22 is connected with MGND, and pin 4 of the optocoupler U22 is connected with +5V through a pull-up resistor R110 and outputs a signal MPhaseLeft. The signal AuxVcc is connected with pins 1 of optocouplers U12 and U13 through R79, pin 2 of the optocoupler U12 is connected with ZeroL, pin 3 of the optocoupler U12 is connected with MGND, and pin 4 of the optocoupler U12 is connected with +5V through a pull-up resistor R95 and outputs a signal MZeroLine. Pin 2 of the optocoupler U13 is connected with ZeroN, pin 3 of the optocoupler U13 is connected with MGND, and pin 4 of the optocoupler U13 is connected with +5V through a pull-up resistor R96 and outputs a signal MZeroNatrue. A signal MOutputSwitch is connected with +5V through a pull-up resistor R97 and connected with pin 1 of an optocoupler U14 through R80, pin 2 of the optocoupler U14 is connected with MGND, pin 3 of the optocoupler U14 is connected with AuxGnd, and pin 4 of the optocoupler U14 outputs a signal OutputSwitch.

Figure 18:
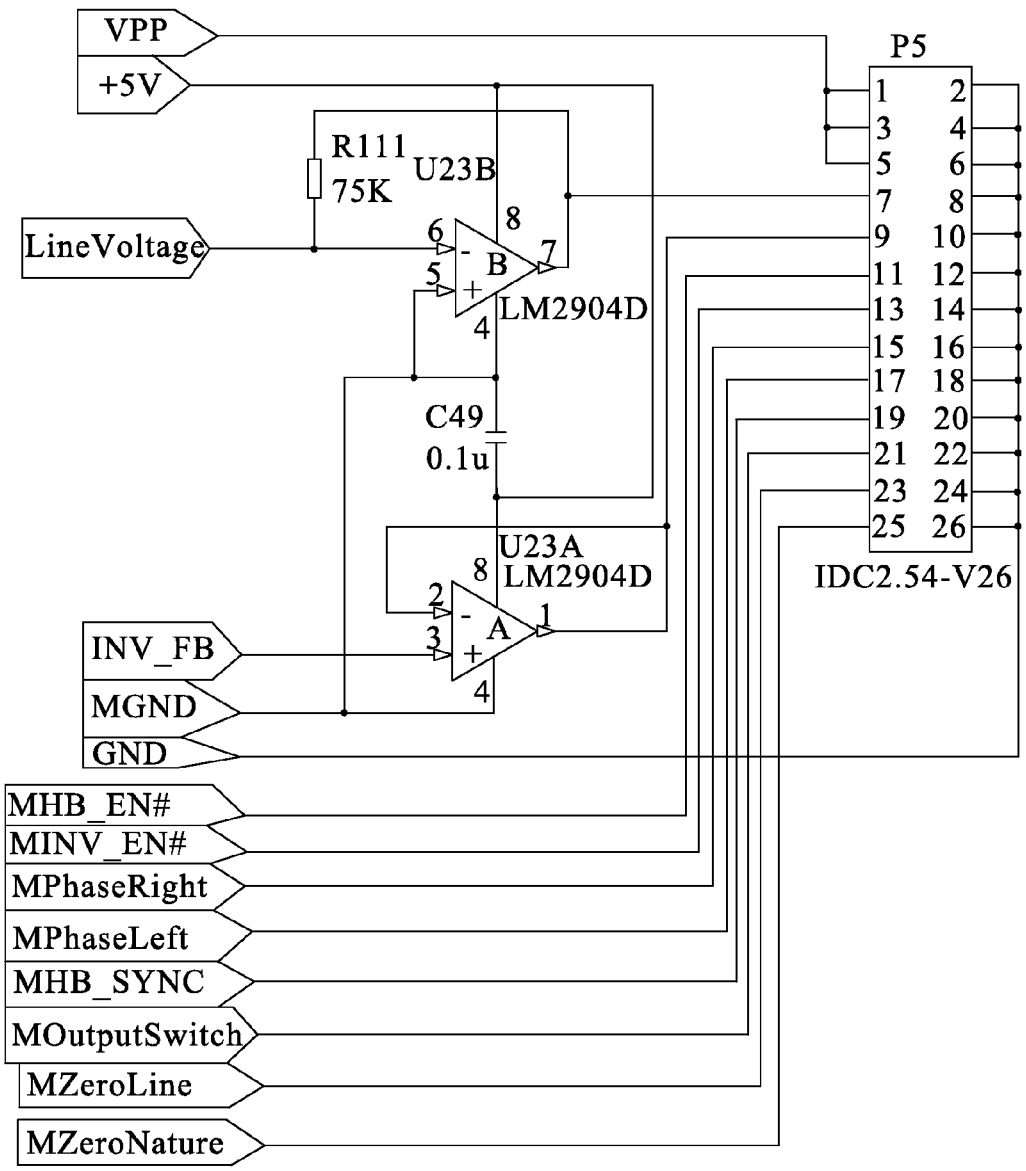
FIG. 18 is the diagram of the signal interface circuit in the embodiment of the present invention.

The signal interface circuit is shown in FIG. 18. Pin 8 of an amplifier U23A (LM2904D) is connected with +5V, pin 4 of U23A is connected with MGND, pin 3 of U23A is connected with the signal INV_FB, and pins 1 and 2 of U23A are directly connected and then connected with pin 9 of P5. Pin 8 of an amplifier U23B (LM2904D) is connected with +5V, pins 4 and 5 of U23B are directly connected and then connected with MGND, pin 6 of U23B is connected with the signal LineVoltage, pin 7 of U23B is connected in series with R111 and then connected with pin 6 of U23B, pin 7 is also connected with pin 7 of P5. Pins 2, 4, 6, 8, 10, 12, 14, 16, 18, 20, 22, 24 and 26 of a connector P5 are connected with GND, pins 1, 3 and 5 of connector P5 are connected with VPP, pin 11 of the connector P5 is connected with MHB_EN#, pin 13 of connector P5 is connected with MINV_EN#, pin 15 of connector P5 is connected with MPhaseRight, pin 17 of the connector P5 is connected with MPhaseLeft, pin 19 of the connector P5 is connected with MHB_SYNC, pin 21 of the connector P5 is connected with MOutputSwitch, pin 23 of the connector P5 is connected with MZeroLine, and pin 25 of the connector P5 is connected with MZeroNature. The voltage signal LineVoltage obtained in the 220V grid voltage detecting circuit is conditioned and amplified by an operational amplifier LM2904D and then input to pin 7 of the connector P5. The voltage signal INV_FB obtained in the transformer output full-bridge rectifier circuit is conditioned and amplified by an operational amplifier LM2904D and then input to pin 9 of the connector P5. The voltage signals and the signals need to be input to or output from the SCM are connected to P5. The SCM control and display unit is communicated with the AC-to-DC energy storage unit and the inverter output unit through the interface of P5.

Figure 20:
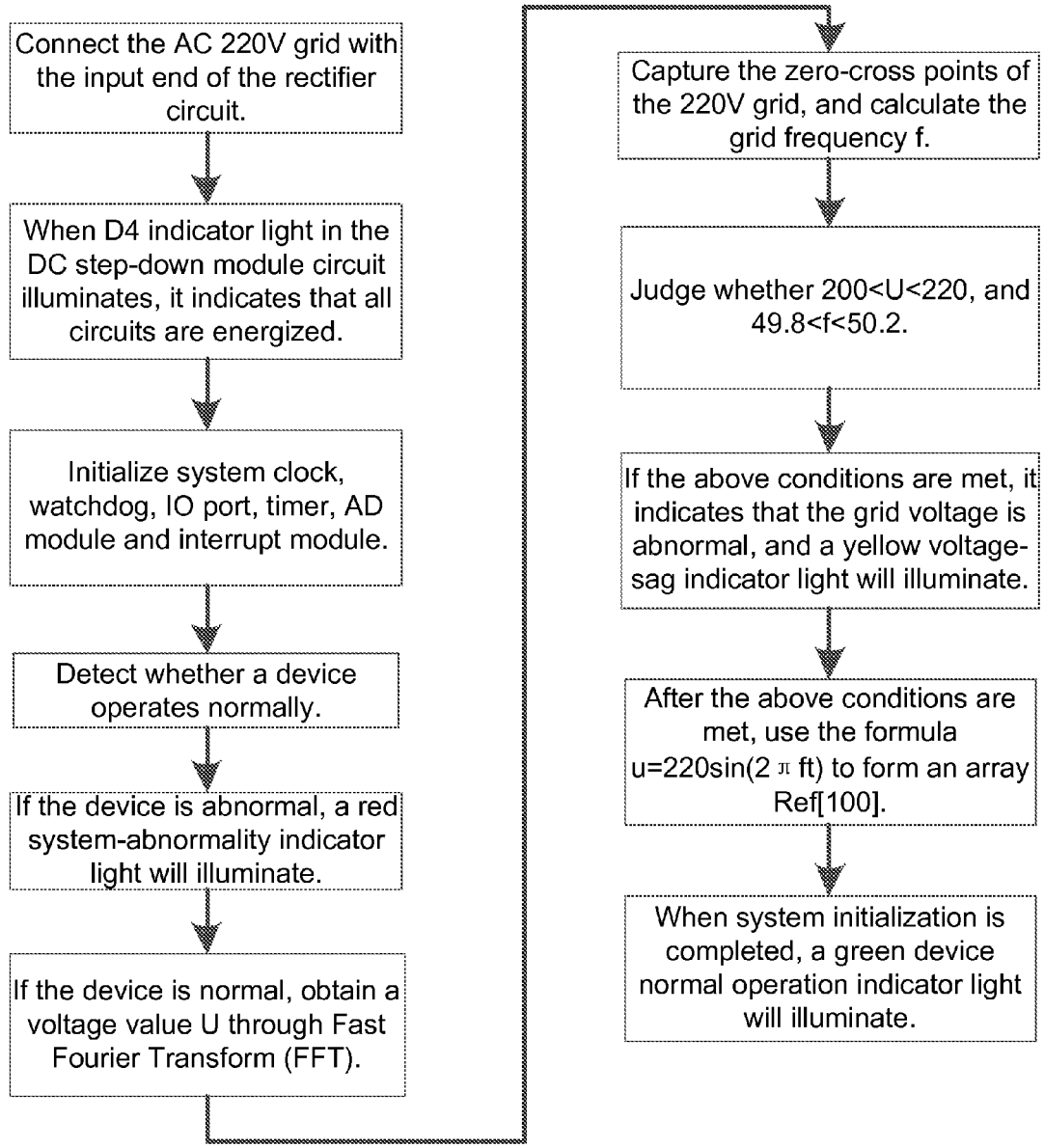
FIG. 20 is the schematic diagram of the initialization process of the SCM in the embodiment of the present invention.

As shown in FIG. 20, the SCM in the embodiment need to be initialized as follows:
(1) Connect the AC 220V grid with the input end of the rectifier circuit.
(2) When D4 indicator light in the DC step-down module circuit illuminates, it indicates that all circuits are energized.
(3) Initialize system clock, watchdog, IO port, timer, AD module and interrupt module.
(4) The SCM detects whether hardware devices are operating normally by sending out a control command and detecting the output voltage of the energy storage voltage detecting circuit, the output voltage of the rectifier circuit of high level AC voltage, and the output signals of the PWM generating circuit.
(5) If abnormality of a hardware device is detected, a red system-abnormality indicator light will illuminate.
(6) If a hardware device is normal, the device will sample the voltage of the 220V grid through the 220V grid voltage detecting circuit and an AD sampling port of the SCM, and obtain a voltage value U through Fast Fourier Transform (FFT).
(7) Capture the zero-cross points of the 220V grid through the 220V grid zero-cross point detecting circuit and a capture port of the SCM, and calculate the grid frequency f.
(8) Compare the calculated voltage value U and grid frequency f respectively with the ranges of 200<U<220 and 49.8<f<50.2 to see whether the grid voltage is normal.
(9) If the grid voltage U and the grid frequency f are not in the above-mentioned ranges, it indicates that the grid voltage is abnormal, a yellow voltage-sag indicator light will illuminate, the device will not operate, and the grid voltage and grid frequency will be continuously detected until the grid voltage and grid frequency return to normal ranges.
(10) After the grid voltage and grid frequency return to normal ranges, use the formula u=220 sin(2πft) to form a standard sine table containing 100 numbers, and save this table in an array Ref[100].
(11) When system initialization is completed, a green device normal operation indicator light will illuminate.

Figure 21A:
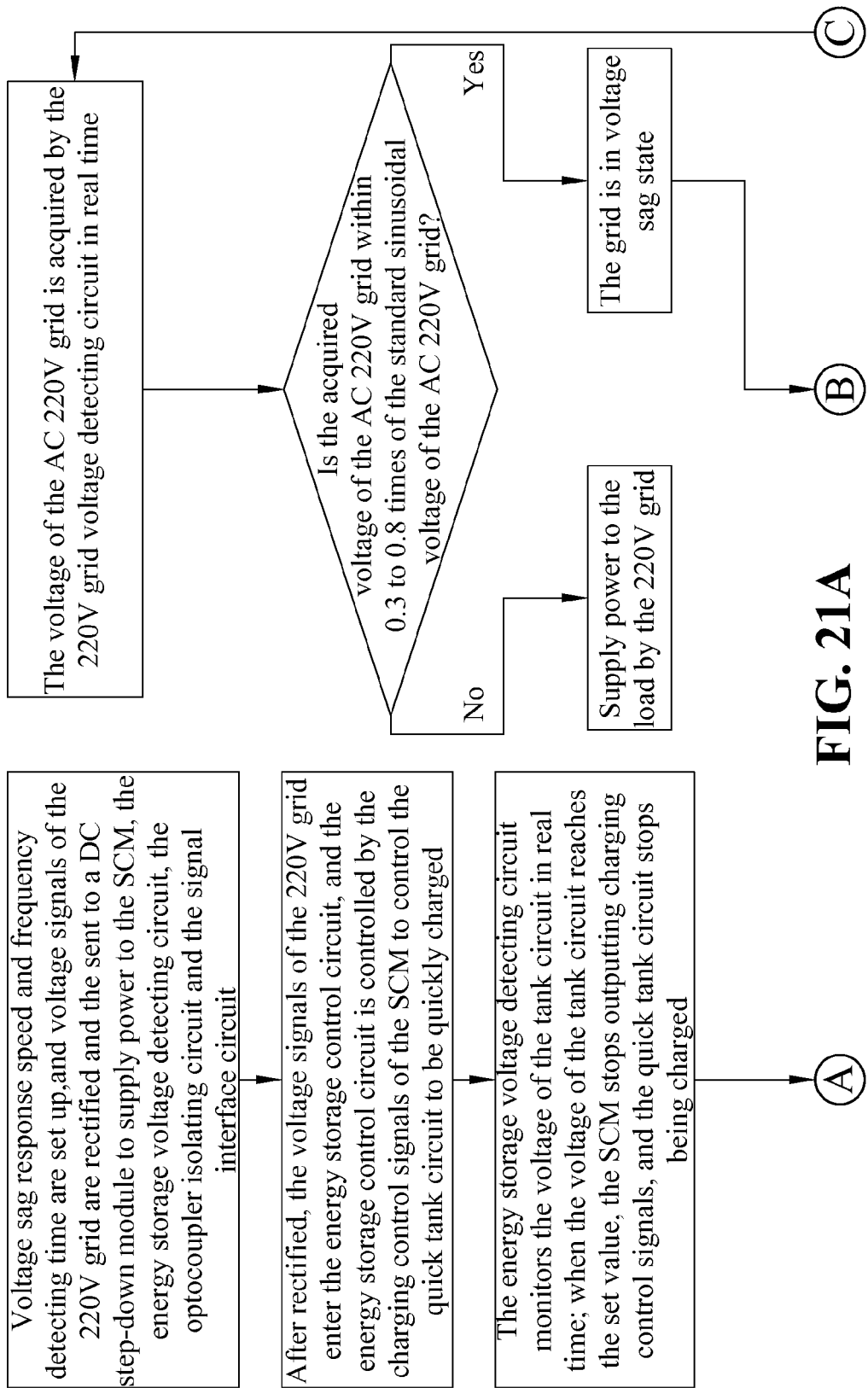
FIGS. 21A, 21B and 21C are the flow chart of the control method for the bypass type 220V grid voltage sag prevention device in the embodiment of the present invention.
Figure 21B:
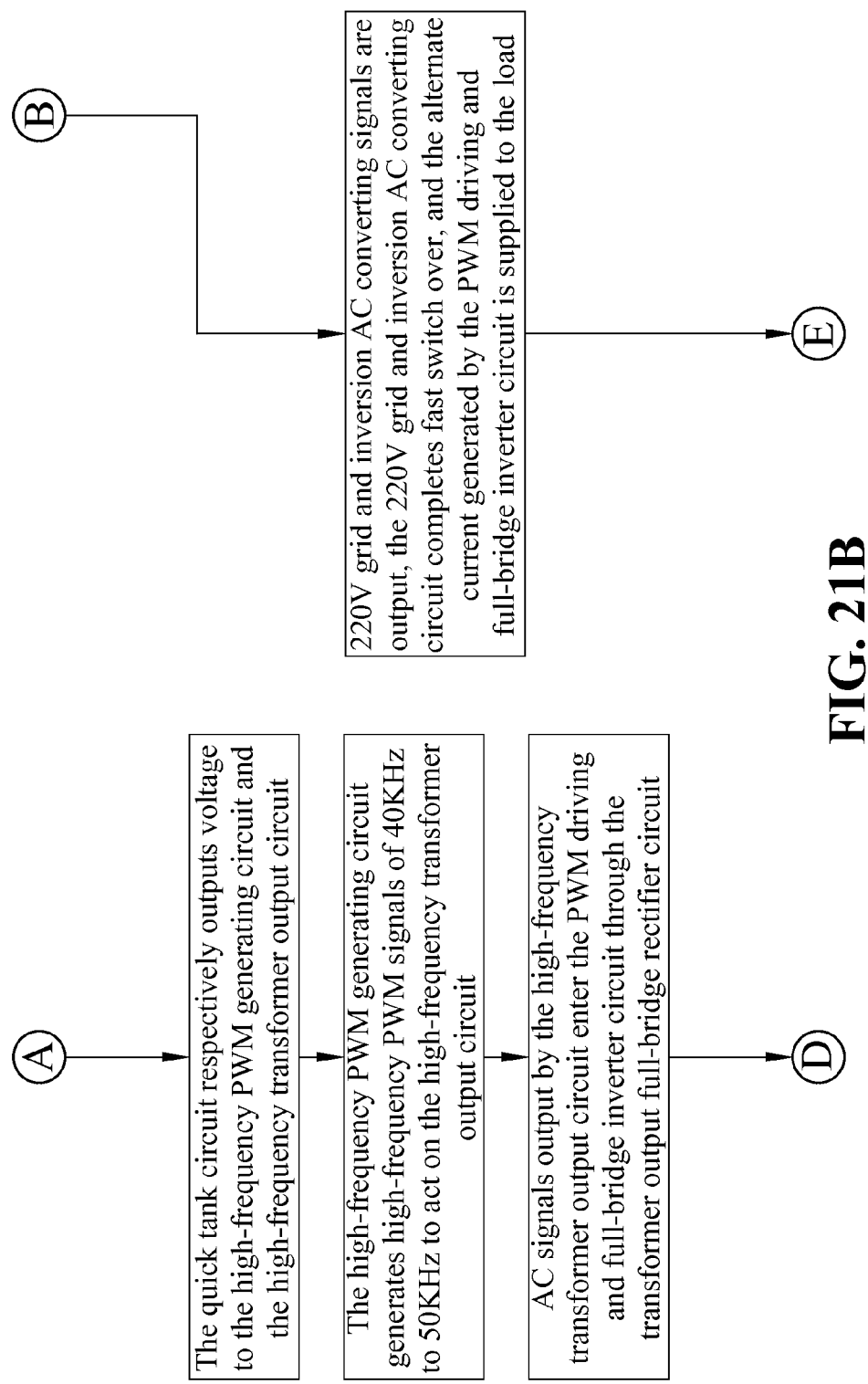
Figure 21C:
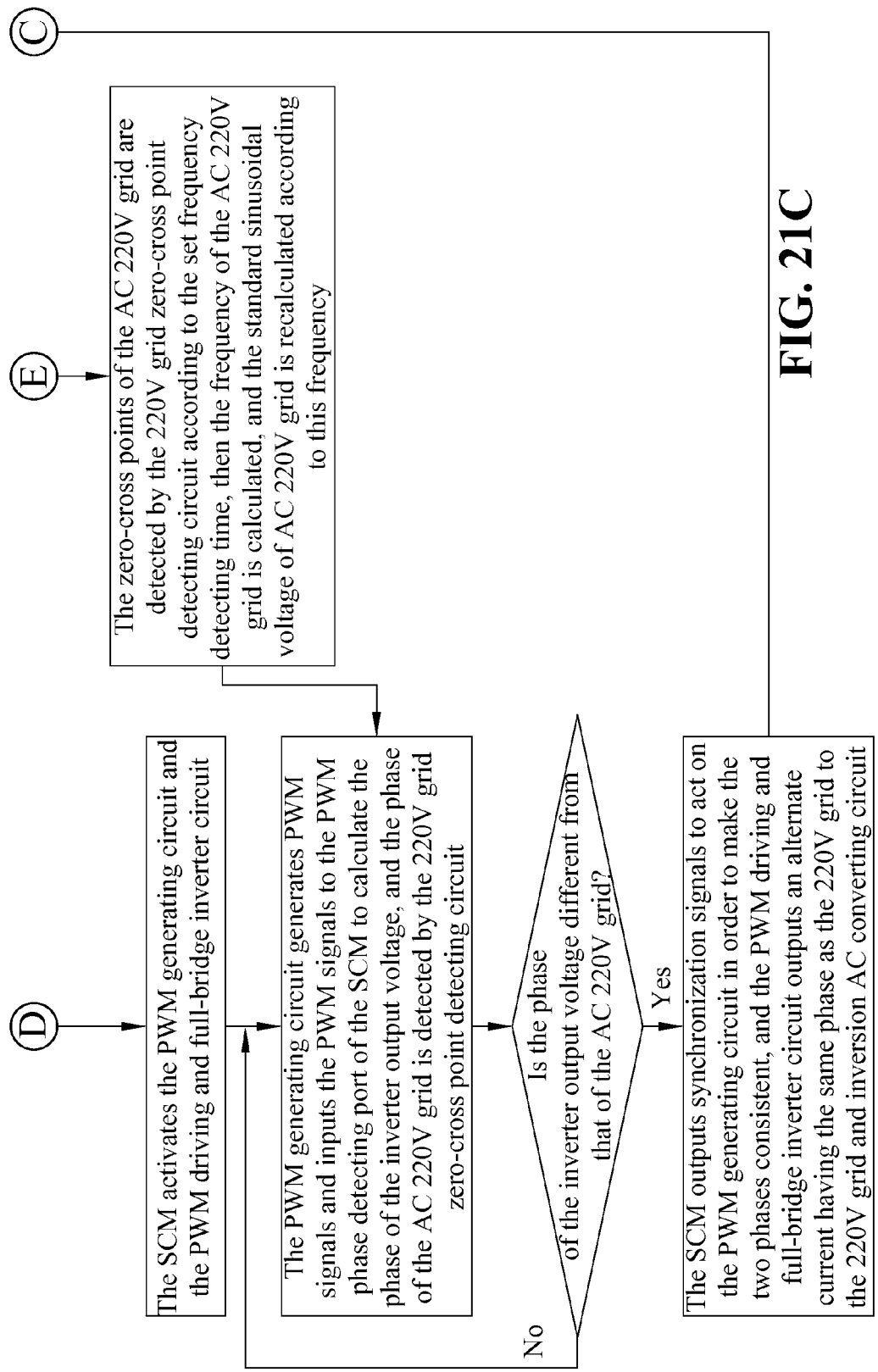

The control method for the bypass type 220V grid voltage sag prevention device is shown in FIGS. 21A, 21B and 21C, comprising the following steps:

Step 1: Voltage sag response speed and frequency detecting time are set up by the SCM, and voltage signals of the 220V grid are rectified by the rectifier circuit and then sent to a DC step-down module to supply power to the SCM, the energy storage voltage detecting circuit, an optocoupler isolating circuit and the signal interface circuit.

Step 2: After rectified by the rectifier circuit, the voltage signals of the 220V grid enter the energy storage control circuit, and the energy storage control circuit is controlled by the charging control signals of the SCM to control the quick tank circuit to be quickly charged.

Step 3: The energy storage voltage detecting circuit monitors the voltage of the tank circuit in real time; when the voltage of the tank circuit reaches the set value, the SCM stops outputting charging control signals, and the quick tank circuit stops being charged.

Step 4: The quick tank circuit respectively outputs voltage to the high-frequency PWM generating circuit and the high-frequency transformer output circuit.

Step 5: The high-frequency PWM generating circuit generates high-frequency PWM signals of 40 KHz to 50 KHz to act on the high-frequency transformer output circuit.

Step 6: AC signals output by the high-frequency transformer output circuit enter the PWM driving and full-bridge inverter circuit through the transformer output full-bridge rectifier circuit.

What is claimed is:

1. A bypass type 220V grid voltage sag prevention device, comprising:
    an AC-to-DC energy storage unit, comprising a rectifier circuit, an energy storage control circuit and a tank circuit; wherein an input end of the rectifier circuit is connected with a 220V grid, an output end of the rectifier circuit is connected with the input end of the energy storage control circuit, and the output end of the energy storage control circuit is connected with the input end of the tank circuit;
    a Single Chip Microcomputer (SCM) control and display unit, comprising an SCM, a DC step-down module circuit and an energy storage voltage detecting circuit; wherein the input end of the energy storage voltage detecting circuit is connected with one output end of the tank circuit, the output end of the energy storage voltage detecting circuit is connected with a signal input end of the SCM, the input end of the DC step-down module circuit is connected with one output end of the rectifier circuit, the control output end of the SCM is connected with the input end of the energy storage control circuit, and the power supply port of the SCM is connected with the output end of the DC step-down module circuit; and
    an inverter output unit, comprising a PWM generating circuit, a transformer output circuit, a transformer output full-bridge rectifier circuit, a PWM generating circuit, a PWM driving and full-bridge inverter circuit, a 220V grid zero-cross point detecting circuit, a 220V grid voltage detecting circuit, a 220V grid and inversion AC converting circuit, and a signal interface circuit;
    wherein, the input end of the PWM generating circuit is connected with the output end of the quick tank circuit, one output end of the PWM generating circuit is connected with the input end of the DC step-down module circuit, the other output end of the PWM generating circuit is connected with one input end of the transformer output circuit, the other input end of the transformer output circuit is connected with the output end of the quick tank circuit, the output end of the transformer output circuit is connected with the input end of the transformer output full-bridge rectifier circuit, the output end of the transformer output full-bridge rectifier circuit is connected with one input end of the PWM driving and full-bridge inverter circuit, the output end of the PWM driving and full-bridge inverter circuit is connected with one input end of the 220V grid and inversion AC converting circuit, the other two input ends of the PWM driving and full-bridge inverter circuit are respectively connected with the output end of the PWM generating circuit and an enable port of the SCM, the input end of the PWM generating circuit is connected with the signal output port of the SCM, the other two input ends of the 220V grid and inversion AC converting circuit are respectively connected with the signal output end of the SCM and the 220V grid, the output end of the 220V grid and inversion AC converting circuit is connected with a load, the input end of the 220V grid zero-cross point detecting circuit and the input end of the 220V grid voltage detecting circuit are respectively connected with the 220V grid, and the output end of the 220V grid zero-cross point detecting circuit and the output end of the 220V grid voltage detecting circuit are respectively connected with different signal input ends of the SCM.

2. The bypass type 220V grid voltage sag prevention device of claim 1, wherein said SCM control and display unit further comprises an operating condition indicating circuit, a key circuit and an LED display circuit; wherein the output end of the operating condition indicating circuit, the output end of the functional key circuit and the input end of the LED display circuit are respectively connected with different I/O ports of the SCM.

3. A control method for the bypass type 220V grid voltage sag prevention device of claim 1, the method comprising the following steps:
    step 1: voltage sag response speed and frequency detecting time are set up by the SCM, and voltage signals of the 220V grid are rectified by the rectifier circuit and then sent to a DC step-down module to supply power to the SCM, the energy storage voltage detecting circuit, an optocoupler isolating circuit and the signal interface circuit;
    step 2: after rectified by the rectifier circuit, the voltage signals of the 220V grid enter the energy storage control circuit, and the energy storage control circuit is controlled by the charging control signals of the SCM to control the tank circuit to be charged;
    step 3: the energy storage voltage detecting circuit monitors the voltage of the tank circuit in real time; when the voltage of the tank circuit reaches the set value, the SCM stops outputting charging control signals, and the tank circuit stops being charged;
    step 4: the tank circuit respectively outputs voltage to the PWM generating circuit and the y transformer output circuit;
    step 5: the PWM generating circuit generates PWM signals of 40 KHz to 50 KHz to act on the transformer output circuit;
    step 6: AC signals output by the transformer output circuit enter the PWM driving and full-bridge inverter circuit through the transformer output full-bridge rectifier circuit;
    step 7: the SCM activates the PWM generating circuit and the PWM driving and full-bridge inverter circuit;
    step 8: the PWM generating circuit generates PWM signals and inputs the PWM signals to the PWM phase detecting port of the SCM to calculate the phase of the inverter output voltage, meanwhile, the phase of the AC 220V grid is detected by the 220V grid zero-cross point detecting circuit; when the phase of the inverter output voltage is different from that of the AC 220V grid, the SCM outputs synchronization signals to act on the PWM generating circuit in order to adjust the phase of the inverter output voltage and make the two phases consistent; the PWM driving and full-bridge inverter circuit is controlled by the PWM generating circuit to output an alternate current having the same phase as the 220V grid to the 220V grid and inversion AC converting circuit;

step 9: the voltage of the AC 220V grid is acquired by the 220V grid voltage detecting circuit in real time; when the acquired voltage of the AC 220V grid is within 0.3 to 0.8 times of the standard sinusoidal voltage of the AC 220V grid, the grid is in voltage sag state, do step 10; otherwise, supply power to the load by the 220V grid;

step 10: the SCM outputs 220V grid and inversion AC converting signals at the set voltage sag response speed, the 220V grid and inversion AC converting circuit completes fast switch over, and the alternate current generated by the PWM driving and full-bridge inverter circuit is supplied to the load; return to step 8; and step 11: when power is supplied to the load by the 220V grid, the zero-cross points of the AC 220V grid are detected by the 220V grid zero-cross point detecting circuit according to the set frequency detecting time, then the frequency of the AC 220V grid is calculated, and the standard sinusoidal voltage of the AC 220V grid is recalculated according to this frequency; return to step 8.

* * * * *